US011370335B1

(12) United States Patent
Cabrera et al.

(10) Patent No.: US 11,370,335 B1
(45) Date of Patent: Jun. 28, 2022

(54) VEHICLE SEATING ASSEMBLY THAT AIDS IN COUPLING OF AN AUXILIARY SEAT

(71) Applicant: Ford Global Technologies, LLC, Dearborn, MI (US)

(72) Inventors: Gustavo Morales Cabrera, Ecatepec de Morelos (MX); Esteban Mario Anaya Altamirano, Metepec (MX); Ana Carolina Sanchez Ponce, Toluca (MX)

(73) Assignee: Ford Global Technology, LLC, Dearborn, MI (US)

( * ) Notice: Subject to any disclaimer, the term of this patent is extended or adjusted under 35 U.S.C. 154(b) by 0 days.

(21) Appl. No.: 17/172,360

(22) Filed: Feb. 10, 2021

(51) Int. Cl.
  *B60N 2/10* (2006.01)
  *B60N 2/16* (2006.01)
  *B60N 2/18* (2006.01)
  *B60N 2/28* (2006.01)
  *B60N 2/02* (2006.01)

(52) U.S. Cl.
  CPC ......... *B60N 2/2893* (2013.01); *B60N 2/0284* (2013.01); *B60N 2/2806* (2013.01)

(58) Field of Classification Search
  CPC .. B60N 2/0284; B60N 2/2806; B60N 2/2887; B60N 2/2893; B60N 2/1635; B60N 2/164; B60N 2/166
  USPC ............................. 297/253, 284.11, 337, 338
  See application file for complete search history.

(56) References Cited

U.S. PATENT DOCUMENTS

| | | | | |
|---|---|---|---|---|
| 3,550,953 A | * | 12/1970 | Neale | B60N 2/62 297/284.11 X |
| 4,648,654 A | * | 3/1987 | Voss | B60N 2/242 297/337 X |
| 4,709,961 A | * | 12/1987 | Hill | B60N 2/1839 297/284.11 |
| 4,995,580 A | * | 2/1991 | Fujii | B60N 2/1803 248/421 |
| 5,607,204 A | * | 3/1997 | Gryp | B60N 2/0715 297/284.11 |
| 5,918,934 A | * | 7/1999 | Siegrist | B60N 2/2893 297/253 X |
| 6,386,633 B1 | * | 5/2002 | Newton | B60N 2/62 297/284.1 |
| 6,402,245 B1 | * | 6/2002 | Newton | B60N 2/62 297/284.11 |

(Continued)

FOREIGN PATENT DOCUMENTS

| | | | |
|---|---|---|---|
| DE | 3447040 A1 | * | 6/1986 |
| GB | 2468648 A | | 9/2010 |

(Continued)

*Primary Examiner* — Rodney B White
(74) *Attorney, Agent, or Firm* — Vichit Chea; Price Heneveld LLP

(57) ABSTRACT

A vehicle seating assembly includes a seat base with a support structure, a seatback pivotably coupled to the seat base, a first anchor access point positioned in the seat base, a second anchor access point positioned in the seat base and laterally disposed relative to the first anchor access point, a seat surface of the seat base. The seat surface includes a lower portion and a rearward portion. The rearward portion is positioned rearward of the lower portion. The rearward portion is arranged at an angle relative to the lower portion such that the rearward portion and the lower portion are non-parallel to one another. The seat surface is an occupant-facing surface.

16 Claims, 23 Drawing Sheets

(56) References Cited

U.S. PATENT DOCUMENTS

| | | | | |
|---|---|---|---|---|
| 8,042,867 B2* | 10/2011 | Meister | ............... | B64D 11/064 |
| | | | | 297/337 X |
| 8,328,280 B2* | 12/2012 | Parker | .................. | B60N 2/2887 |
| | | | | 297/253 |
| 8,454,089 B2* | 6/2013 | Nett | ..................... | B60N 2/2887 |
| | | | | 297/253 |
| 8,550,555 B2 | 10/2013 | Fritz et al. | | |
| 8,888,181 B2* | 11/2014 | Perraut | ................ | B60N 2/1842 |
| | | | | 297/284.11 |
| 11,046,216 B2* | 6/2021 | Parmar | ................ | B60N 2/2893 |
| 2010/0109401 A1* | 5/2010 | Booth | ................. | B60N 2/0284 |
| | | | | 297/284.11 |
| 2015/0084390 A1* | 3/2015 | Tanaka | ................. | B60N 2/4263 |
| | | | | 297/338 |
| 2018/0361890 A1* | 12/2018 | Ishizaka | ............... | B60N 2/2893 |
| 2019/0047450 A1* | 2/2019 | Bhatia | ................. | B60N 2/2887 |
| 2020/0055427 A1* | 2/2020 | Styn | ..................... | B60N 2/5883 |
| 2020/0223334 A1* | 7/2020 | Parmar | ................ | B60N 2/2893 |
| 2020/0391624 A1* | 12/2020 | Onji | ..................... | B60N 2/2893 |
| 2021/0323452 A1* | 10/2021 | Parmar | ................ | B60N 2/2893 |

FOREIGN PATENT DOCUMENTS

| | | | | | |
|---|---|---|---|---|---|
| JP | 2001199268 A | | 7/2001 | | |
| JP | 2001246973 A | * | 9/2001 | .............. | B60N 2/58 |
| JP | 2004149081 A | | 5/2004 | | |
| JP | 2008296692 A | | 12/2008 | | |
| JP | 2012000745 A | | 1/2012 | | |
| JP | 2012213486 A | | 11/2012 | | |
| KR | 960000652 A | | 1/1996 | | |

\* cited by examiner

VEHICLE SEATING ASSEMBLY THAT AIDS IN COUPLING OF AN AUXILIARY SEAT

FIELD OF THE DISCLOSURE

The present disclosure generally relates to vehicles. More specifically, the present disclosure relates to vehicle seating assemblies.

BACKGROUND OF THE INVENTION

Vehicle seating assemblies that are positioned in rearward rows are often provided with one or more anchors that can be utilized in coupling an auxiliary seat to the vehicle.

SUMMARY OF THE INVENTION

According to a first aspect of the present invention, a vehicle seating assembly includes a seat base with a support structure, a seatback pivotably coupled to the seat base, a first anchor access point positioned in the seat base, a second anchor access point positioned in the seat base and laterally disposed relative to the first anchor access point, a seat surface of the seat base. The seat surface includes a lower portion and a rearward portion. The rearward portion is positioned rearward of the lower portion. The rearward portion is arranged at an angle relative to the lower portion such that the rearward portion and the lower portion are non-parallel to one another. The seat surface is an occupant-facing surface. The lower portion is adjustable relative to the support structure such that a rearward edge of the lower portion is movable relative to the rearward portion.

Embodiments of the first aspect of the invention can include any one or a combination of the following features:
- the angle between the lower portion and the rearward portion is increased when the lower portion is moved from a first position to a second position;
- the first position is a lowered position and the second position is a raised position;
- a first locking bracket that is associated with the first position, a second locking bracket that is associated with the second position, and a linkage assembly that is movable between the first and second locking brackets;
- the linkage assembly includes a ratchet bracket positioned proximate to a forward edge of the seat base, the ratchet bracket defining at least two teeth, a release access point positioned proximate to the rearward edge of the lower portion, a body that extends between the ratchet bracket and the release access point, the body being pivotably coupled to the ratchet bracket, wherein the body defines a channel, and a release assembly housed within the channel of the body and biased to a locked position;
- the release assembly includes a locking pawl that engages with the ratchet bracket to retain the lower portion in a given position chosen from the first position and the second position, a release button positioned proximate to the release access point, a release bar extending between the locking pawl and the release button, and a lock biasing member positioned within the channel and bearing against the locking pawl to provide a biasing force that biases the release assembly to the locked position;
- the release assembly includes a release pin that extends from the release bar, wherein the release pin engages with the first locking bracket when the lower portion is in the first position, and wherein the release pin engages with the second locking bracket when the lower portion is in the second position;
- a lift assembly that engages with an underside of the lower portion;
- the lift assembly includes an actuator that is movable between a lowered position and a raised position;
- the actuator is coupled to a push-push lock assembly, wherein the actuator is provided with a biasing force that biases the actuator to the raised position;
- the lift assembly includes a pull handle coupled to a first end of the actuator, wherein the actuator is rotatably coupled to the seat base at a second end of the actuator, and wherein application of an upward force upon the pull handle adjusts a position of the first end along a length of the lower portion;
- the lift assembly includes a motor, a shaft that is driven to rotate by the motor, and a gear that engages with the shaft such that rotation of the shaft induces rotation of the gear, wherein the rotation of the gear causes the lower portion to be adjusted between the first position and the second position; and
- an electromagnet that is operable between a disengaged state and an engaged state and a locking pin that is susceptible to a magnetic field, the locking pin being received into the lower portion to retain the lower portion in the second position when the electromagnet is in the engaged state.

According to a second aspect of the present disclosure, a vehicle seating assembly includes a seat base having a support structure, a seatback that is pivotably coupled to the seat base, a first anchor access point positioned in the seat base, a second anchor access point positioned in the seat base and laterally disposed relative to the first anchor access point, a seat surface of the seat base, and a ramp assembly. The seat surface includes a lower portion and a rearward portion. The rearward portion is positioned rearward of the lower portion. The rearward portion is arranged at an angle relative to the lower portion such that the rearward portion and the lower portion are non-parallel to one another. The seat surface is an occupant-facing surface. The ramp assembly includes at least one panel that is movable between a stowed position and a deployed position. The at least one panel is deployable from the rearward portion of the seat surface. The at least one panel engages with the lower portion at an intermediate location along a length of the lower portion such that a gap is defined between an underside of the at least one panel and an upper surface of the lower portion.

Embodiments of the second aspect of the present disclosure can include any one or a combination of the following features:
- the at least one panel includes a first panel and a second panel, wherein the first panel defines a cavity therein that receives the second panel, and wherein the second panel is operable to a deployed position relative to the first panel;
- the ramp assembly is housed within a panel recess that is defined by the rearward portion, wherein the first panel and the second panel are each operable between a retracted position and an extended position relative to the panel recess;
- a panel biasing member coupled to a back wall of the panel recess, wherein the panel biasing member is positioned and configured to be received within the cavity of the first panel such that the panel biasing member acts upon the second panel, and wherein the panel biasing member biases the ramp assembly to the deployed position;

the ramp assembly is rotatably coupled to the rearward portion at a first end of the first panel;

the at least one panel includes a first panel and a second panel, wherein the first panel is rotatably coupled to the rearward portion at a first end, and wherein the second panel is rotatably coupled to the first panel at a second end of the first panel; and the second panel extends over at least a portion of the seatback when the ramp assembly is in the stowed position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
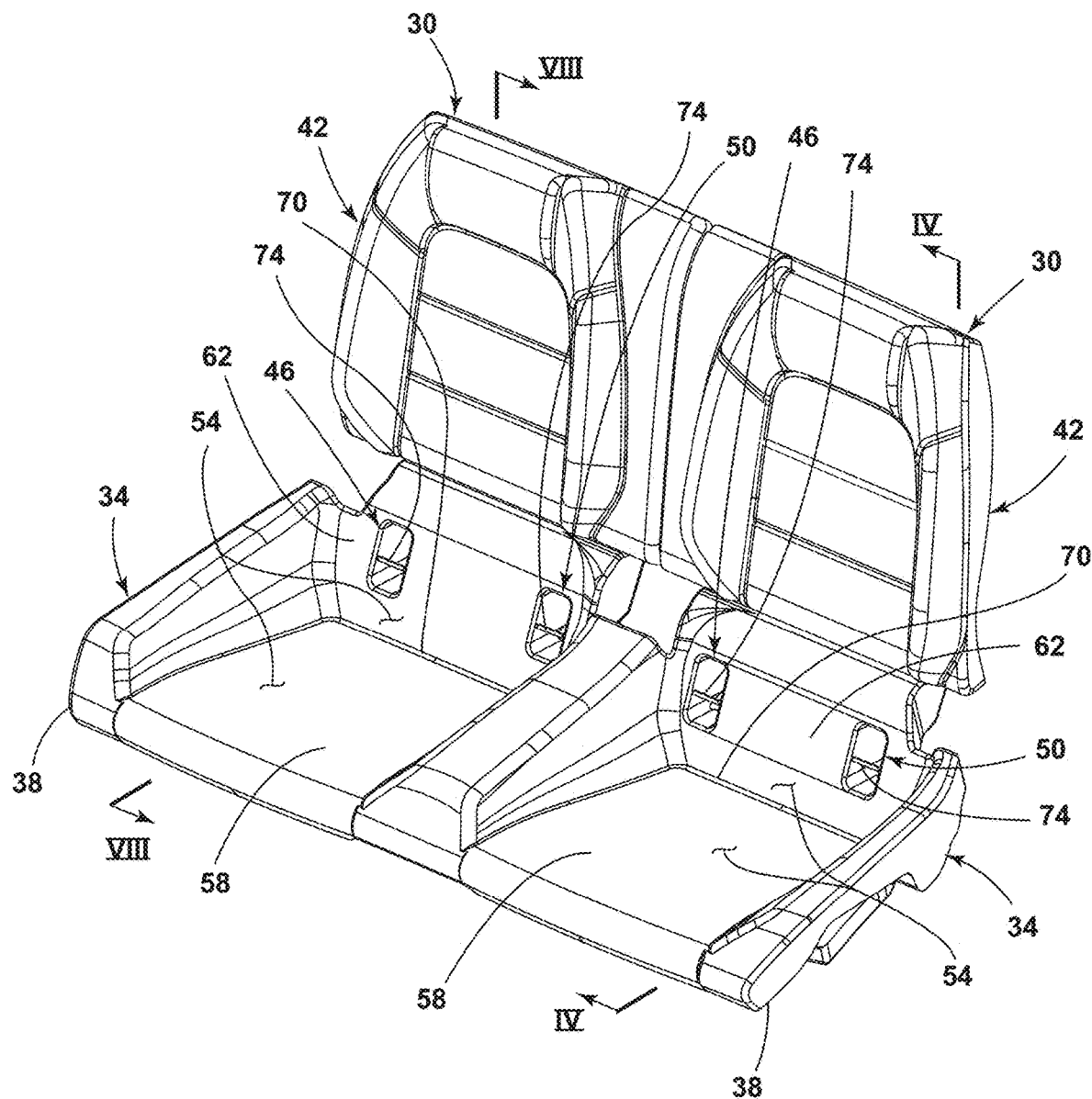
FIG. 1 is a front perspective view of a plurality of vehicle seating assemblies, illustrating the vehicle seating assemblies in a use position, according to one example.
Figure 2:
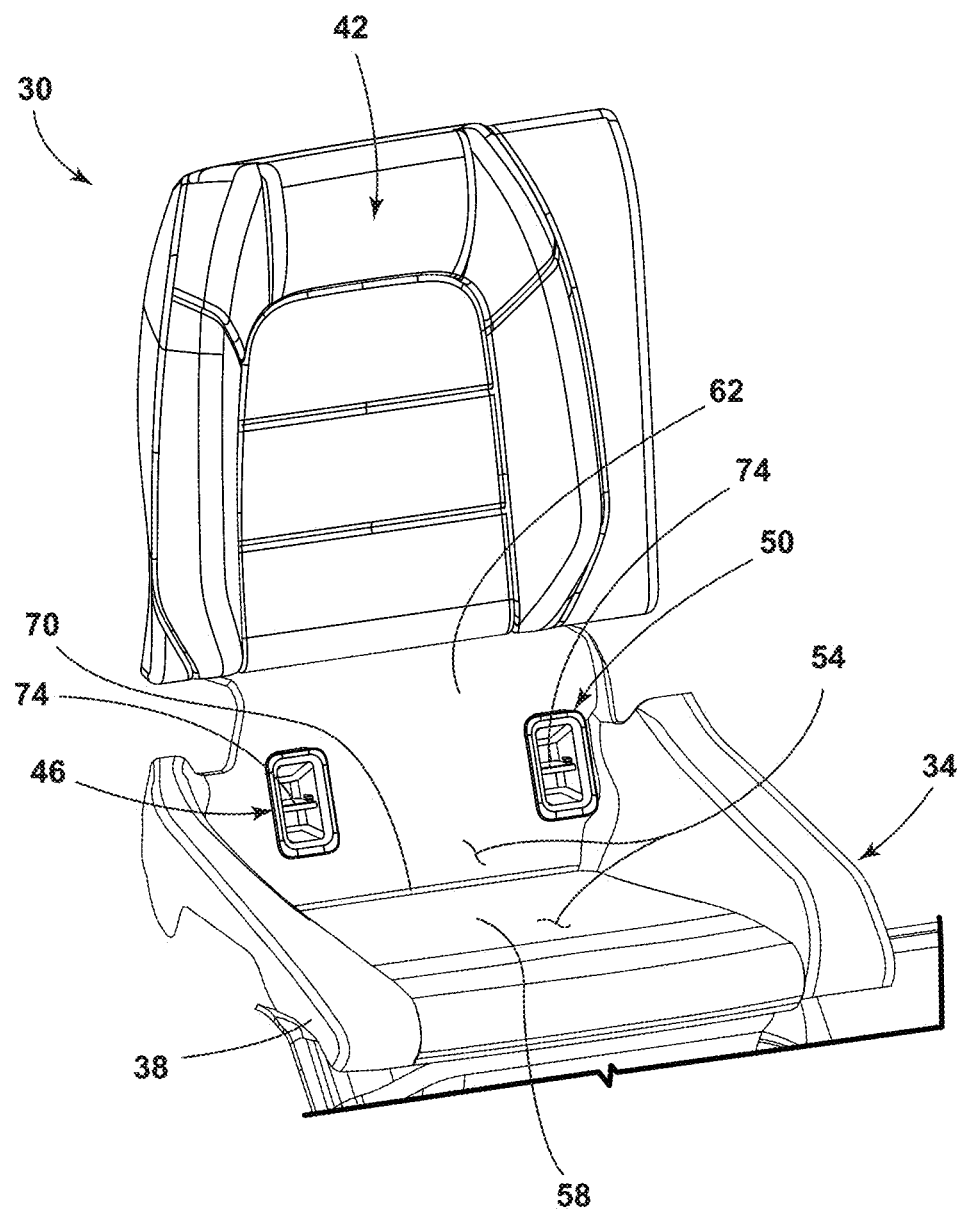
FIG. 2 is a front perspective view of the vehicle seating assembly, illustrating anchors positioned within first and second anchor access points, according to one example.
Figure 3:
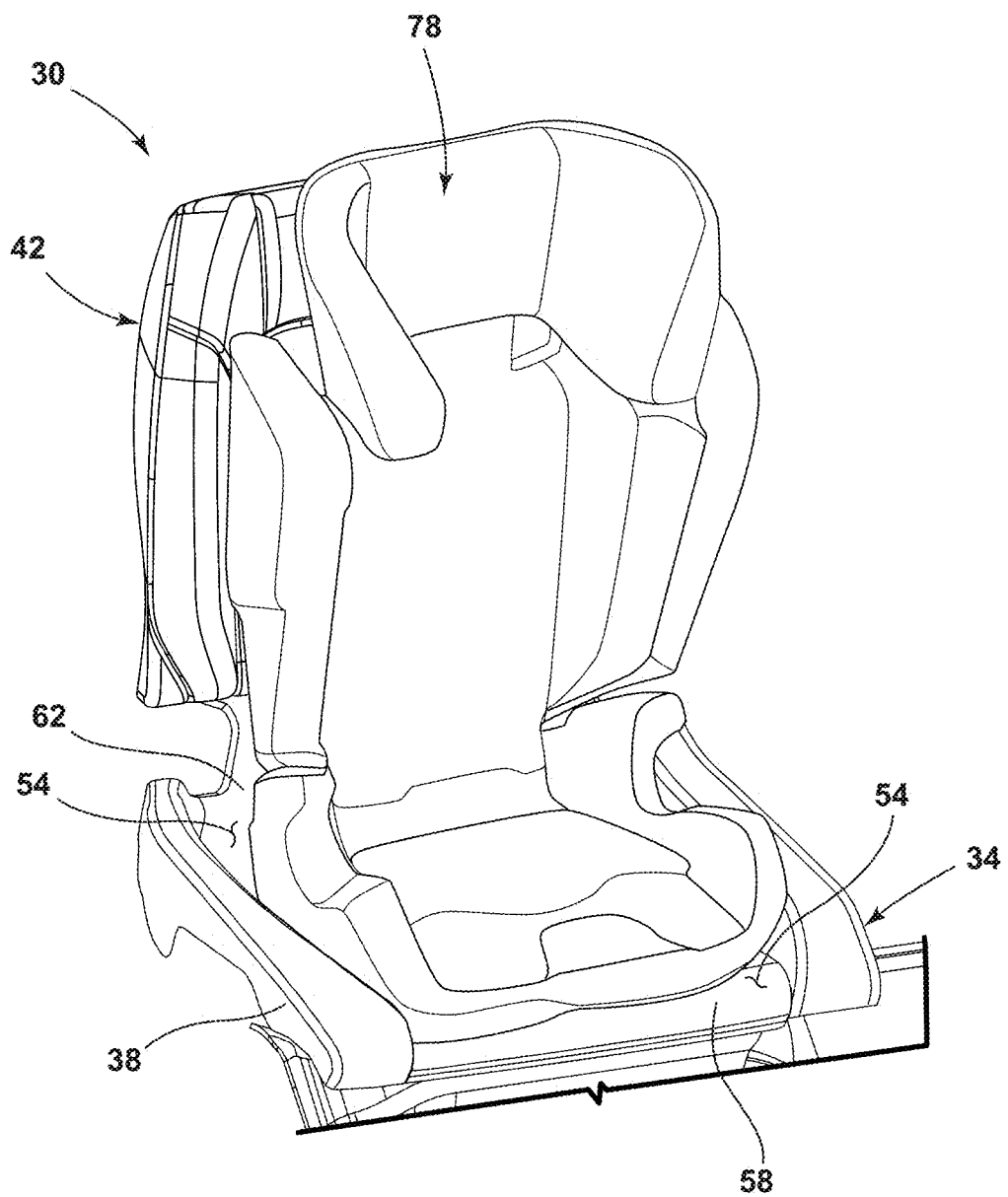
FIG. 3 is a front perspective view of the vehicle seating assembly with an auxiliary seat coupled thereto, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-14, reference numeral 30 generally designates a vehicle seating assembly. The vehicle seating assembly 30 includes a seat base 34 with a support structure 38, a seatback 42 pivotably coupled to the seat base 34, a first anchor access point 46 positioned in the seat base 34, a second anchor access point 50 positioned in the seat base 34 and laterally disposed relative to the first anchor access point 46, and a seat surface 54 of the seat base 34. The seat surface 54 includes a lower portion 58 and a rearward portion 62. The rearward portion 62 is positioned rearward of the lower portion 58. The rearward portion 62 is arranged at an angle 66 relative to the lower portion 58 such that the rearward portion 62 and the lower portion 58 are non-parallel to one another. The seat surface 54 is an occupant-facing surface of the vehicle seating assembly 30. The lower portion 58 is adjustable relative to the support structure 38 such that a rearward edge 70 of the lower portion 58 is movable relative to the rearward portion 62.

Referring again to FIGS. 1-3, the vehicle seating assembly 30 can be positioned in a rearward row within a vehicle. In various examples, the vehicle may be a motor vehicle. For example, the vehicle may be a land-based vehicle (e.g., an automobile, a train, etc.), an air-based vehicle (e.g., an airplane), and/or a water-based vehicle (e.g., a boat or other watercraft). While the vehicle may be a motor vehicle, the present disclosure is not limited to internal combustion engines as a source of locomotive power for the vehicle. Rather, alternative sources may be utilized in providing locomotive power to the vehicle. For example, locomotive power may be provided to the vehicle by electric motors, fuel cells, and/or petroleum-based fuel engines. According to various examples, the vehicle may be driver-controlled, semi-autonomous, fully-autonomous, or any combination of user-controlled and automated. For example, the semi-autonomous example of the vehicle may perform many or all commuting functions (e.g., accelerating, braking, turning, signaling, etc.) independent of user interaction while the user maintains override control of the vehicle. When seating assemblies, such as the vehicle seating assembly 30, are positioned in rearward rows within the vehicle, anchors 74 are sometimes provided as a way of coupling an auxiliary seat 78 to the vehicle seating assembly 30.

Figure 4:
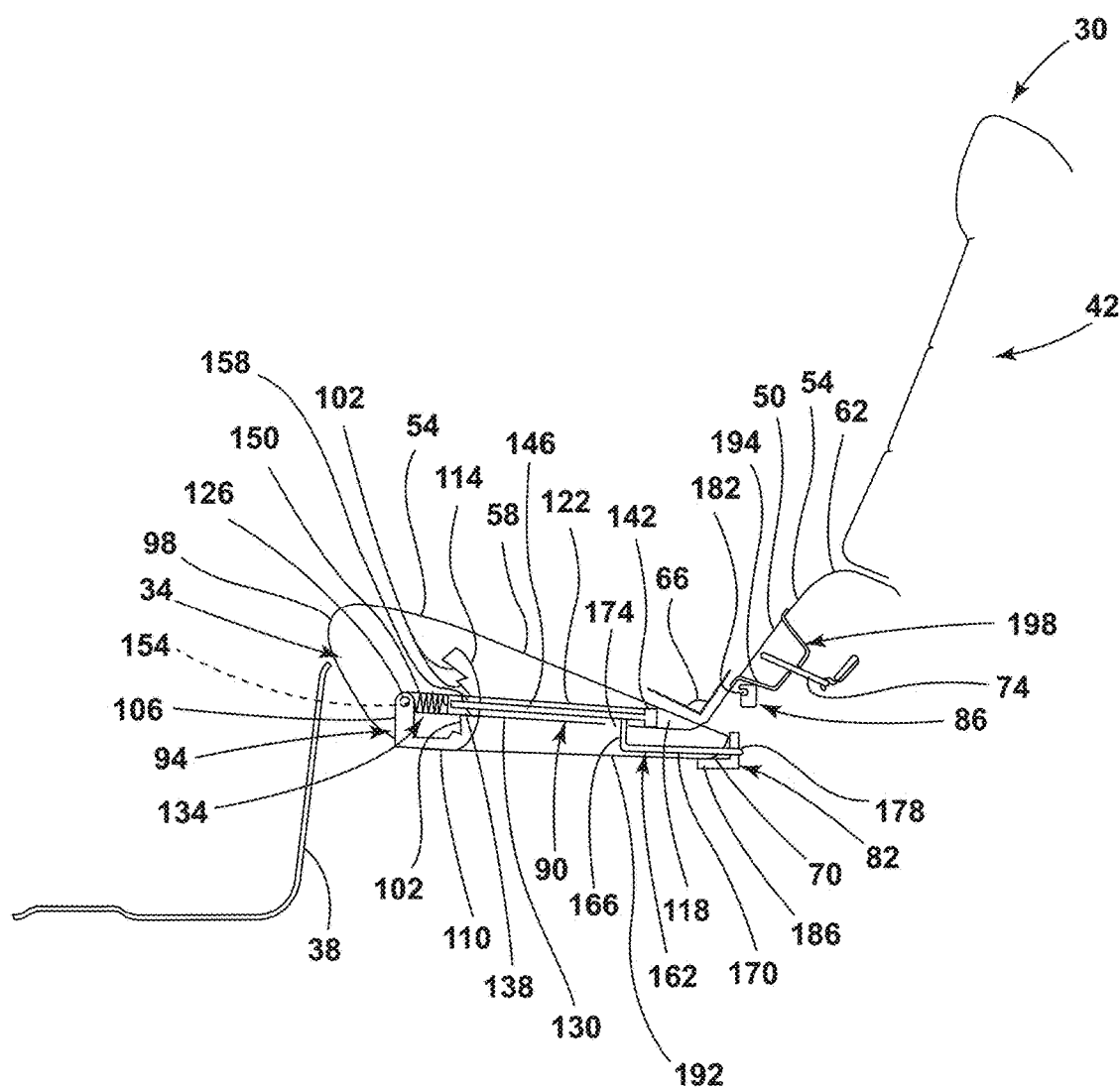
FIG. 4 is a cross-sectional view of the vehicle seating assembly, taken along line IV-IV of FIG. 1, illustrating a linkage assembly in a first position, according to one example.
Figure 5:
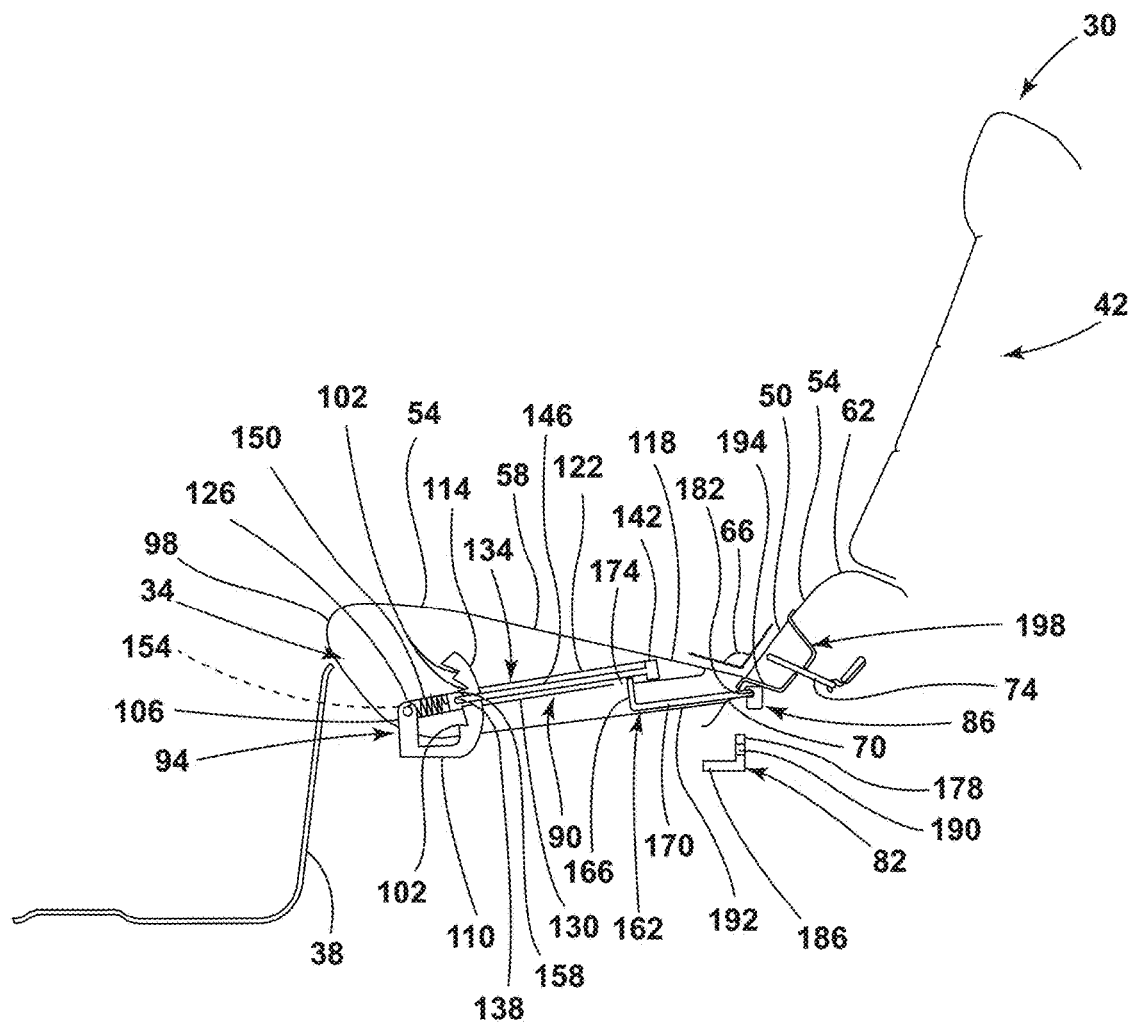
FIG. 5 is a cross-sectional view of the vehicle seating assembly, taken along line IV-IV of FIG. 1, illustrating the linkage assembly in a second position, according to one example.
Figure 6:
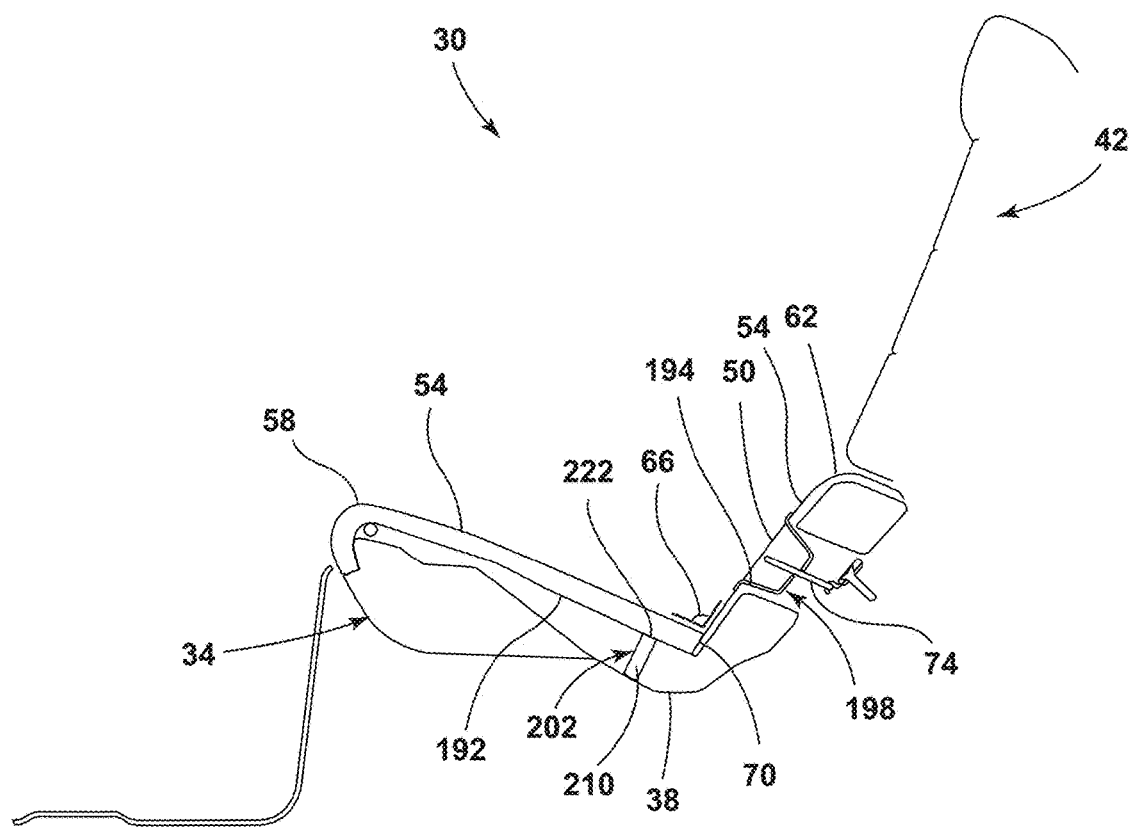
FIG. 6 is a cross-sectional view of the vehicle seating assembly, taken along line IV-IV of FIG. 1, illustrating a lift assembly in the first position, according to one example.
Figure 7:
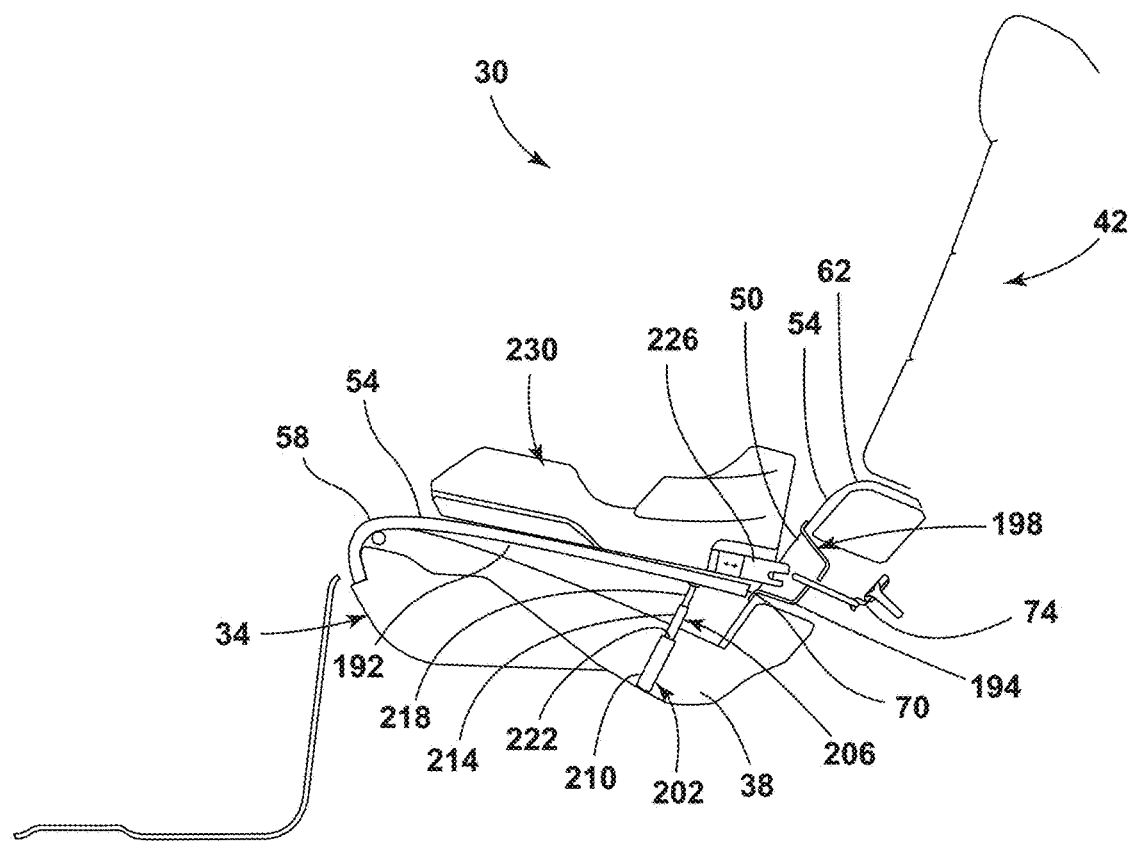
FIG. 7 is a cross-sectional view of the vehicle seating assembly, taken along line IV-IV of FIG. 1, illustrating the lift assembly in the second position with a base of the auxiliary seat positioned on the vehicle seating assembly, according to one example.

Referring now to FIGS. 4 and 5, the seat base 34 is shown in a first position (FIG. 4) and a second position (FIG. 5). In various examples, the first position may be referred to as a lowered position and the second position may be referred to as a raised position. In some examples, the angle 66 between the lower portion 58 and the rearward portion 62 may be increased when the lower portion 58 is moved from the first position to the second position. In various examples, the vehicle seating assembly 30 can include a first locking bracket 82 and a second locking bracket 86. In such examples, the first locking bracket 82 can be associated with the first position (see FIG. 4) and the second locking bracket 86 can be associated with the second position (see FIG. 5). A linkage assembly 90 can be provided that is movable between the first and second locking brackets 82, 86. The linkage assembly 90 includes a ratchet bracket 94 that is positioned proximate to a forward edge 98 of the seat base 34. The ratchet bracket 94 defines at least two teeth 102 therein. In various examples, the ratchet bracket 94 can be defined by a vertical portion 106, a horizontal portion 110, and an arcuate portion 114. In the depicted example, the arcuate portion 114 of the ratchet bracket 94 defines the teeth 102. The linkage assembly 90 and/or the seat base 34 can include a release access point 118 that is positioned proximate to the rearward edge 70 of the lower portion 58. A body 122 of the linkage assembly 90 extends between the ratchet bracket 94 and the release access point 118. The body 122 is pivotably coupled to the ratchet bracket 94 at pivot point 126. Accordingly, the body 122 is movable relative to the ratchet bracket 94 between at least the first position and the second position. The body 122 defines a channel 130. A release assembly 134 is housed within the channel 130 of the body 122. The release assembly 134 is biased to a locked position.

Referring again to FIGS. 4 and 5, the release assembly 134 includes a locking pawl 138 that engages with the ratchet bracket 94 to retain the lower portion 58 in a given position. The position that the lower portion 58 is retained in as a result of the engagement between the locking pawl 138 and the ratchet bracket 94 may be, but is not limited to, the first position or the second position. When the locking pawl 138 is engaged with, or in direct contact with, one of the teeth 102 of the arcuate portion 114, such engagement may represent the locked position for the release assembly 134. The release assembly 134 also includes a release button 142 that is positioned proximate to the release access point 118. A release bar 146 extends between the locking pawl 138 and the release button 142 such that motion imparted to the release button 142 is transmitted to the locking pawl 138. A lock biasing member 150 is positioned within the channel 130 and bears against the locking pawl 138 to provide a biasing force that biases the release assembly 134 to the locked position. For example, the lock biasing member 150 can engage with a forward wall 154 of the channel 130 and a forward surface 158 of the locking pawl 138. Alternatively, the lock biasing member 150 can engage with a portion of the vertical portion 106 of the ratchet bracket 94 and the forward surface 158 of the locking pawl 138. In various examples, the lock biasing member 150 can be a spring, such as a coil spring.

Referring further to FIGS. 4 and 5, the release assembly 134 can include a release pin 162 that extends from the release bar 146. The release pin 162 can include a first leg 166 and a second leg 170. In the depicted example, the first leg 166 and the second leg 170 are non-parallel to one another. The body 122 of the linkage assembly 90 can define a slot 174 therein. The first leg 166 of the release pin 162 extends through the slot 174. The release pin 162 engages with the first locking bracket 82 when the lower portion 58 is in the first position. More specifically, the second leg 170 of the release pin 162 can be received within a first aperture 178 of the first locking bracket 82 when the lower portion 58 is in the first position and the release assembly 134 is in the locked position. Similarly, the release pin 162 engages with the second locking bracket 86 when the lower portion 58 is in the second position. More specifically, the second leg 170 of the release pin 162 can be received within a pin recess 182 of the second locking bracket 86 when the lower portion 58 is in the second position and the release assembly 134 is in the locked position. While the first locking bracket 82 is referred to as having the aperture 178 and the second locking bracket 86 is referred to as having the pin recess 182, it is contemplated that the first locking bracket 82 may alternatively be supplied with a recess and/or the second locking bracket 86 may be supplied with an aperture. Accordingly, it is within the scope of the present disclosure for the first and second locking bracket 82, 86 to each be provided with a structure that receives the release pin 162 when the release assembly 134 is in the locked position without limiting the present disclosure to a particular aperture or recess configuration. In the depicted example, the first locking bracket 82 is provided with a horizontal region 186 and a vertical region 190. The horizontal region 186 can receive an underside 192 of the lower portion 58 such that a greater degree of support is provided to the seat base 34 when in the first position when compared to the second position. In various examples, placing the seat base 34 and/or the lower portion 58 in the second position may align the lower portion 58 of the seat surface 54 with a lower surface 194 of a recess 198 that houses the anchor 74.

Referring further to FIGS. 4 and 5, in use, a user accesses the release assembly 134 by way of the release access point 118. The user applies a force to the release button that is counter or opposite to the biasing force provided by the lock biasing member 150. As the user applies the force to the release button 142, the locking pawl 138, the release button 142, the release bar 146, and the release pin 162 are actuated in the direction of the applied force that is against the biasing force provided by the lock biasing member 150. More specifically, upon application of the force by the user, the release button 142 is actuated toward the forward edge 98 of the seat base 34 and this motion is transmitted to the locking pawl 138 and the release pin 162 by way of the release bar 146. As the release button 142 is actuated toward the forward edge 98 of the seat base 34, the locking pawl 138 disengages with a given one of the teeth 102 and the release pin 162 disengages with the first locking bracket 82. Now, the lower portion 58 of the seat surface 54 can be actuated in an upward direction toward the second position that is associated with the second locking bracket 86. Once the second position has been assumed by the seat base 34 and/or the lower portion 58 of the seat surface 54, the user may release the force applied to the release button 142 and the locking pawl 138 may be biased toward the locked position relative to another one of the teeth 102 while the release pin 162 engages with the second locking bracket 86. Accordingly, the lock biasing member 150 can provide the biasing force to the locking pawl 138 and the release pin 162 such that two locking arrangements are engaged by a single biasing member. When the seat base 34 and/or the lower portion 58 of the seat surface 54 are transitioned from the first position to the second position, the ratchet bracket 94 may remain stationary such that the locking pawl 138 is transitioned from a lower one of the teeth 102 to an upper one of the teeth 102.

Referring to FIGS. 6-14, the vehicle seating assembly 30 can include a lift assembly 202 that engages with the underside 192 of the lower portion 58. The lift assembly 202 can include an actuator 206 that is movable between a lowered position (see FIGS. 6, 8, 11, and 13) and a raised position (see FIGS. 7, 10, 12, and 14). In some examples, such as that depicted in FIGS. 6 and 7, the actuator 206 may be a telescopic actuator having a housing 210, a first section 214, and a second section 218. In such an example, the second section 218 may be received within the first section 214 and the first and second sections 214, 218 may each be received within the housing 210. In some examples, the underside 192 of the lower portion 58 may engage with a top surface 222 of the housing 210 when the lower portion 58 is in the first position. The coupling or engagement between the actuator 206 and the underside 192 of the lower portion 58 may permit pivoting or rotational motion of the lower portion 58 relative to the actuator 206. For example, the second section 218 may be coupled to the underside 192 of the lower portion 58 in a manner that allows an angular relationship between the actuator 206 and the lower portion 58 to vary as the actuator 206 is adjusted between the lowered position and the raised position. In one specific example, the underside 192 of the lower portion 58 may be provided with a bracket that receives a terminal end of the actuator 206. In such an example, the terminal end of the actuator 206 and the bracket provided on the underside 192 of the lower portion 58 can define apertures that receive a pin or axle about which rotation of the actuator 206 relative to the lower portion 58 is permitted.

Referring again to FIGS. 6-14, in some examples, the actuator 206 can be coupled to a push-push lock assembly. Accordingly, a user applying a downward force upon the lower portion 58, particularly proximate to the rearward edge 70, may disengage the push-push lock assembly and place the push-push lock assembly in an unlocked state. The actuator 206 may be provided with a biasing force that biases the actuator 206 to the raised position. Accordingly, upon unlocking the push-push lock assembly, the lower portion 58 may be transitioned from the lowered position to the raised position. In various examples, placing the seat base 34 and/or the lower portion 58 in the second position may align the lower portion 58 of the seat surface 54 with the lower surface 194 of the recess 198 that houses the anchor 74. When the lower portion 58 is in the raised or second position, the auxiliary seat 78 may rest upon the lower portion 58 and a coupling member 226 of a base 230 of the auxiliary seat 78 may be engaged with the anchor 74. In some examples, the auxiliary seat 78 can omit the base 230 such that the coupling member 226 is directly attached to the auxiliary seat 78.

Figure 8:
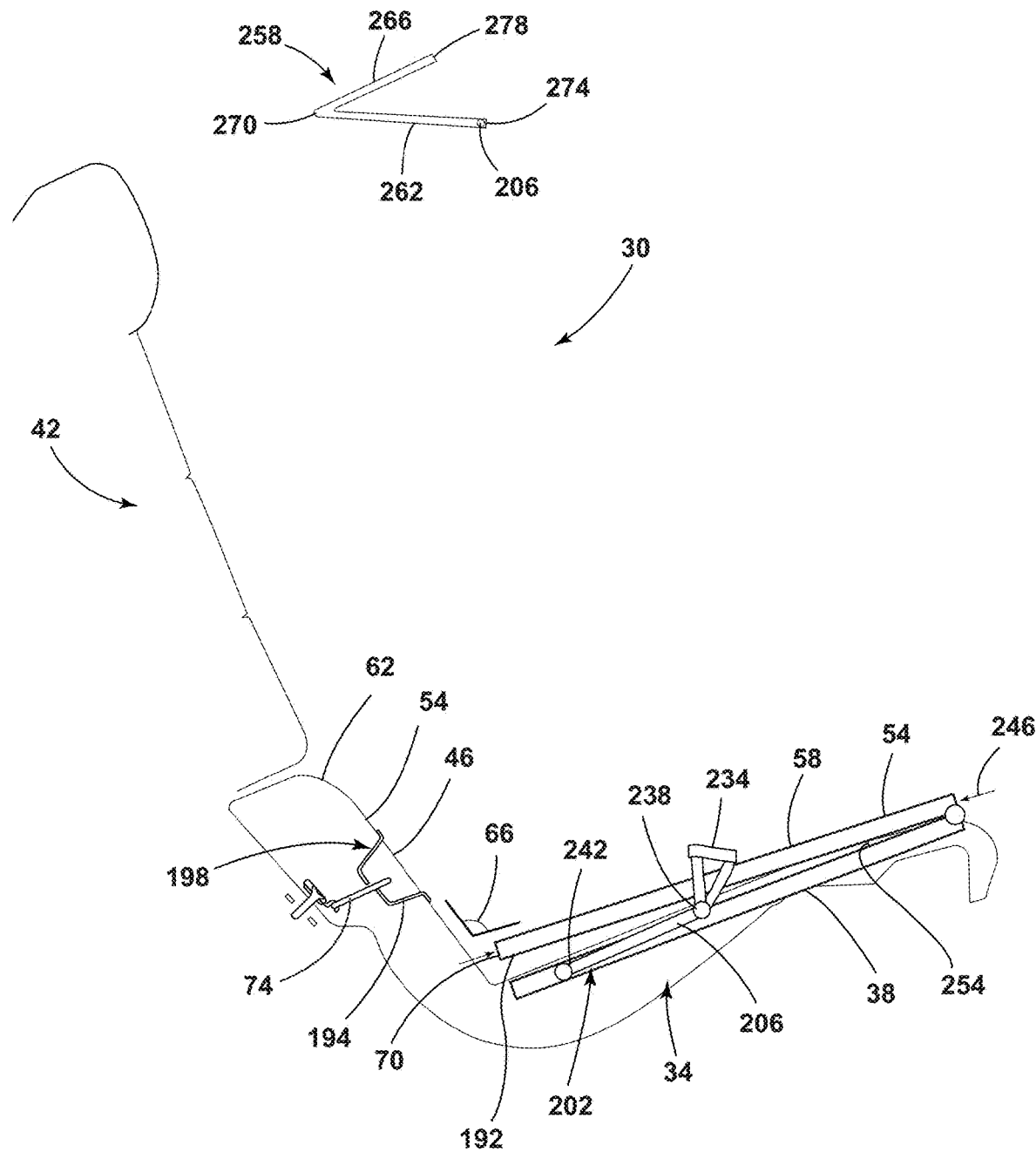
FIG. 8 is a cross-sectional view of the vehicle seating assembly, taken along line VIII-VIII of FIG. 1, illustrating the lift assembly in the first position, according to another example.
Figure 9:
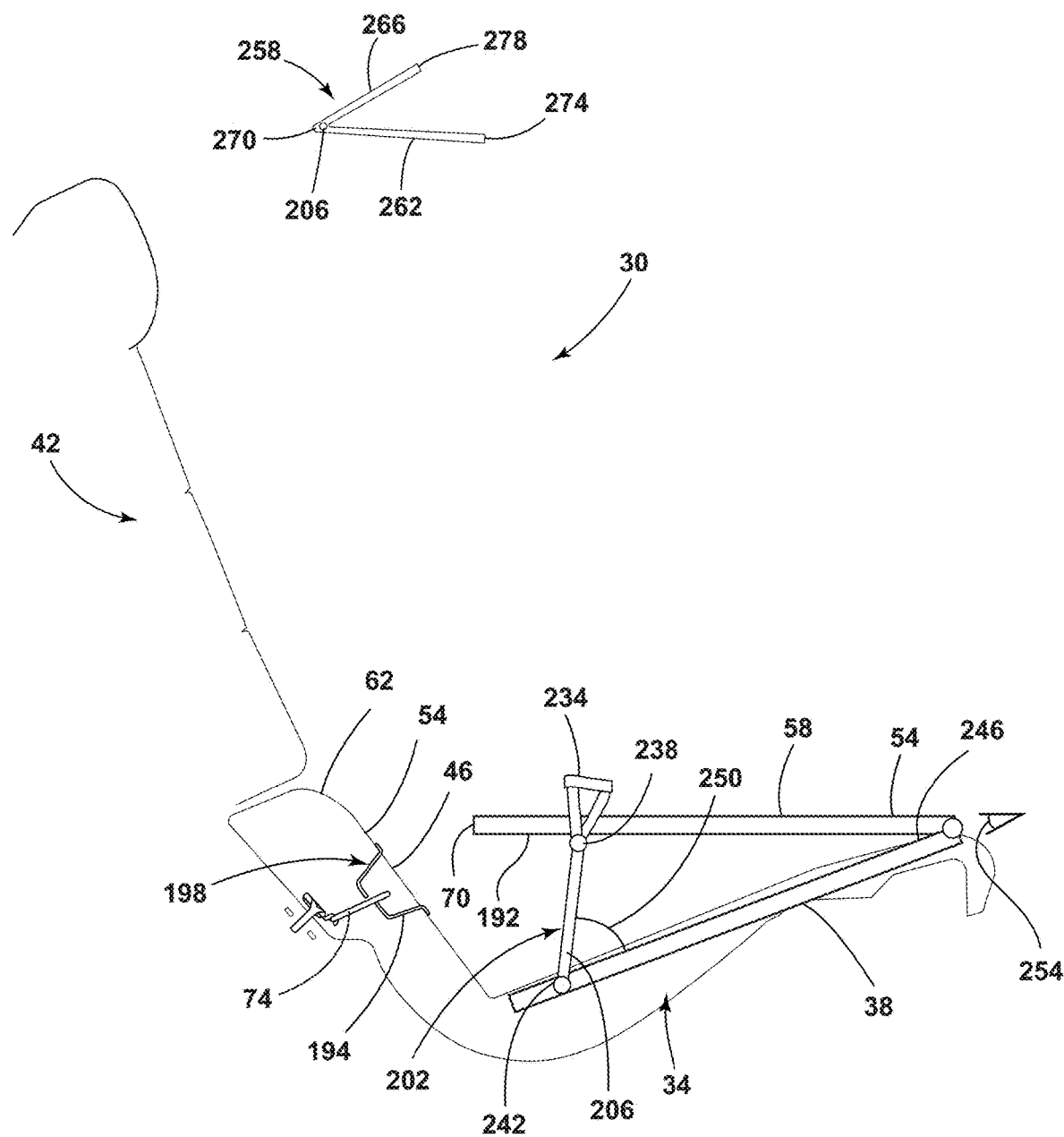
FIG. 9 is a cross-sectional view of the vehicle seating assembly, taken along line VIII-VIII of FIG. 1, illustrating the lift assembly in an intermediate position, according to another example.
Figure 10:
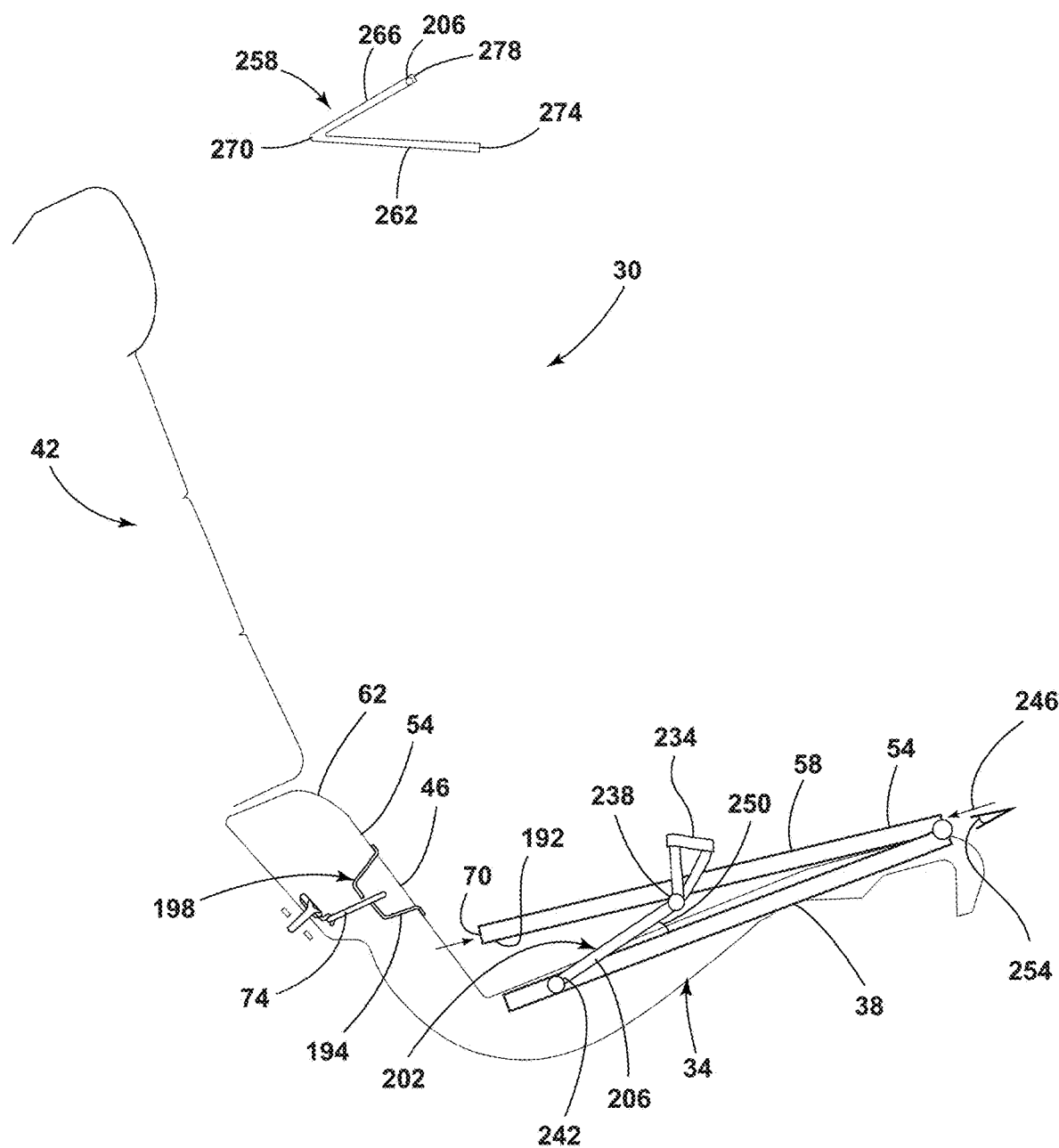
FIG. 10 is a cross-sectional view of the vehicle seating assembly, taken along line VIII-VIII of FIG. 1, illustrating the lift assembly in the second position, according to another example.
Figure 11:
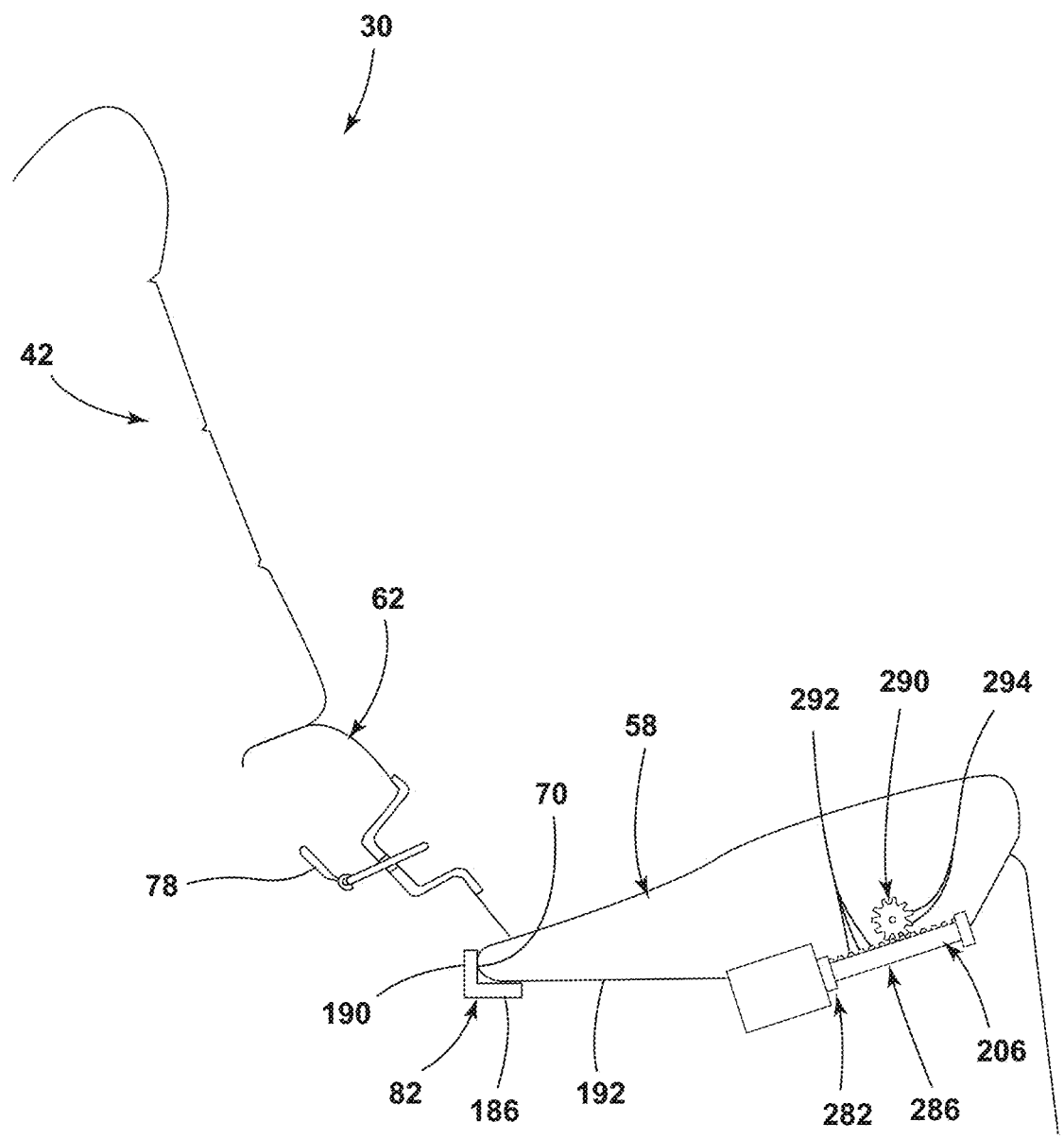
FIG. 11 is a cross-sectional view of the vehicle seating assembly, taken along line VIII-VIII of FIG. 1, illustrating the lift assembly in the first position, according to one example.
Figure 12:
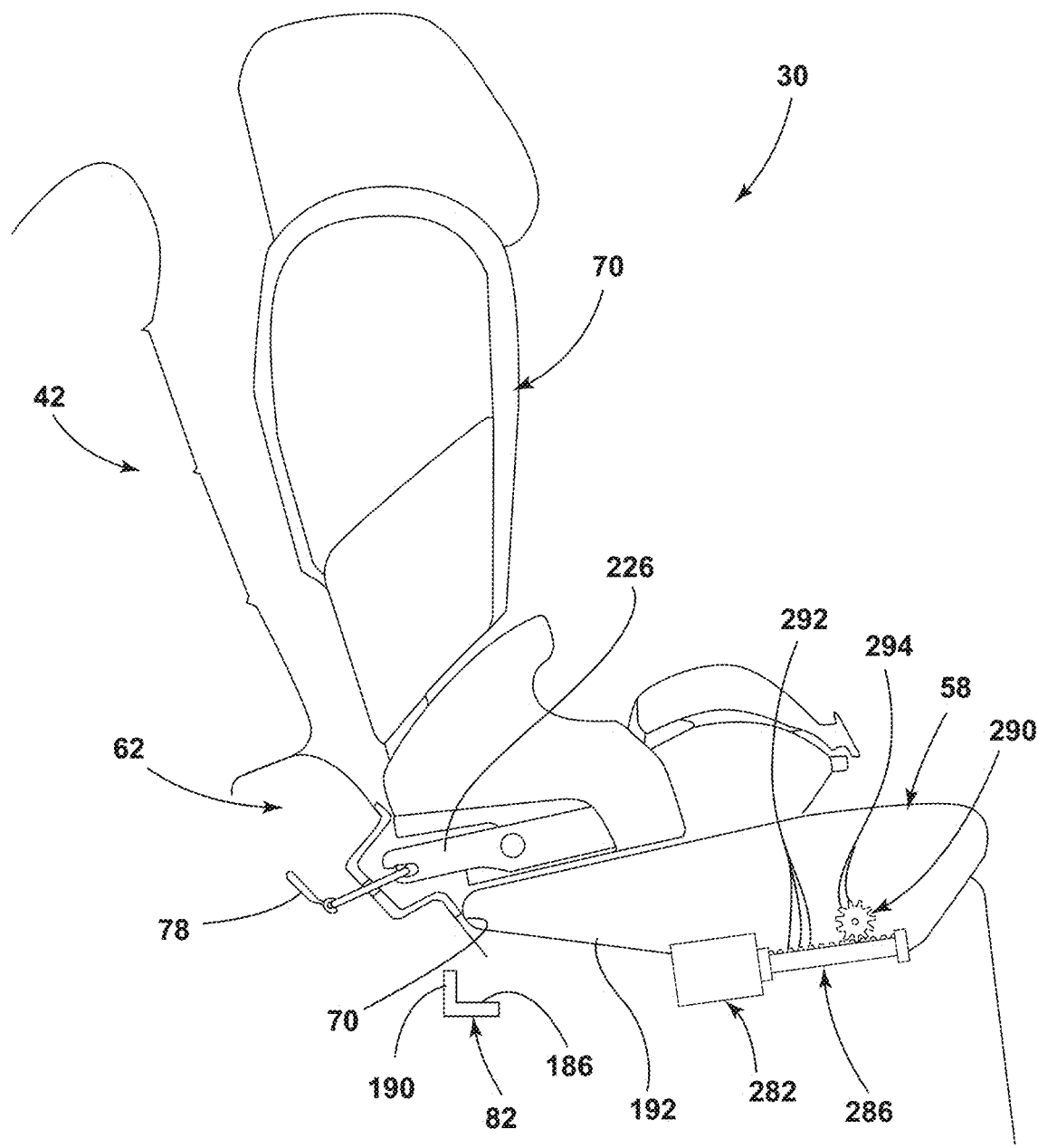
FIG. 12 is a cross-sectional view of the vehicle seating assembly, taken along line VIII-VIII of FIG. 1, illustrating the lift assembly in the second position, according to one example.
Figure 13:
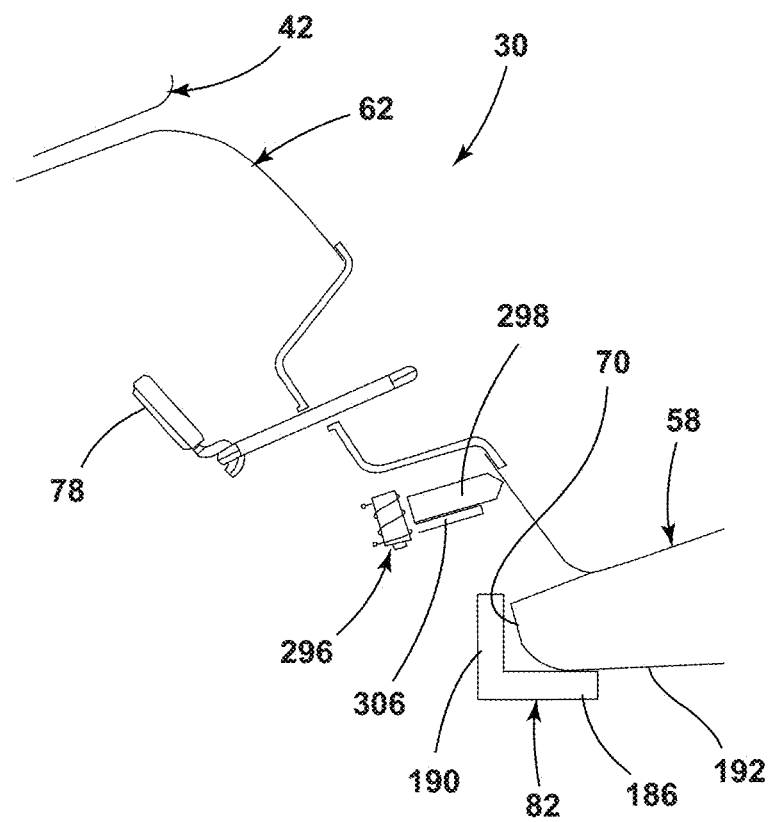
FIG. 13 is an expanded cross-sectional view of the vehicle seating assembly, taken along line VIII-VIII of FIG. 1, illustrating a locking pin in a retracted position, according to one example.
Figure 14:
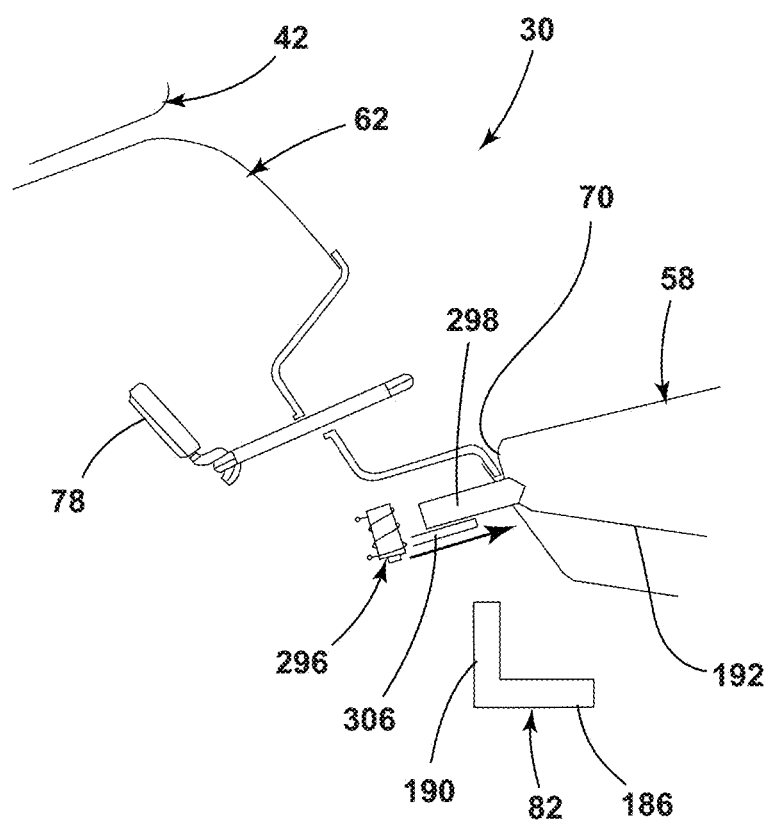
FIG. 14 is an expanded cross-sectional view of the vehicle seating assembly, taken along line VIII-VIII of FIG. 1, illustrating the locking pin an extended position, according to one example.
Figure 15:
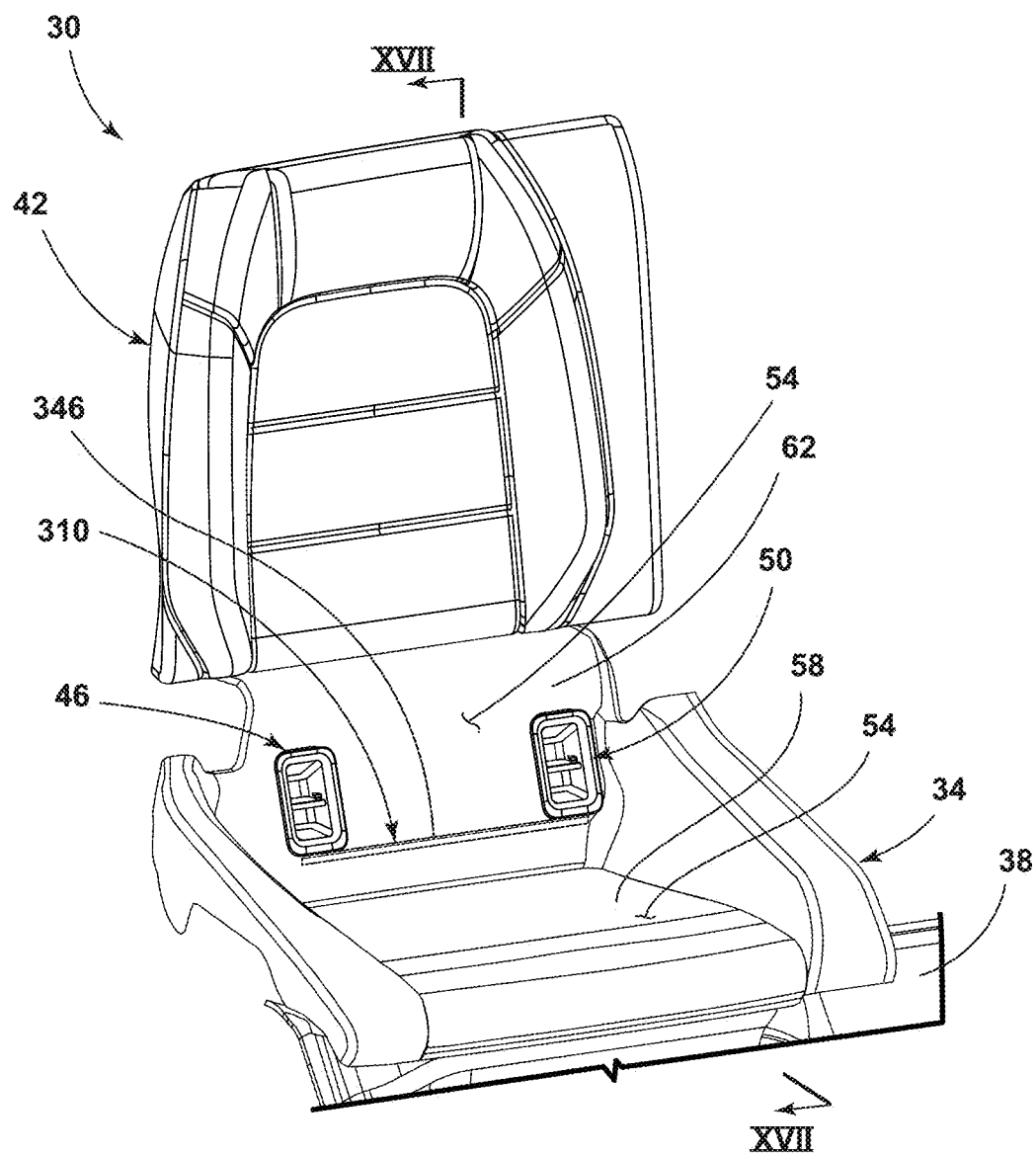
FIG. 15 is a front perspective view of the vehicle seating assembly, illustrating a ramp assembly in a stowed position, according to one example.
Figure 16:
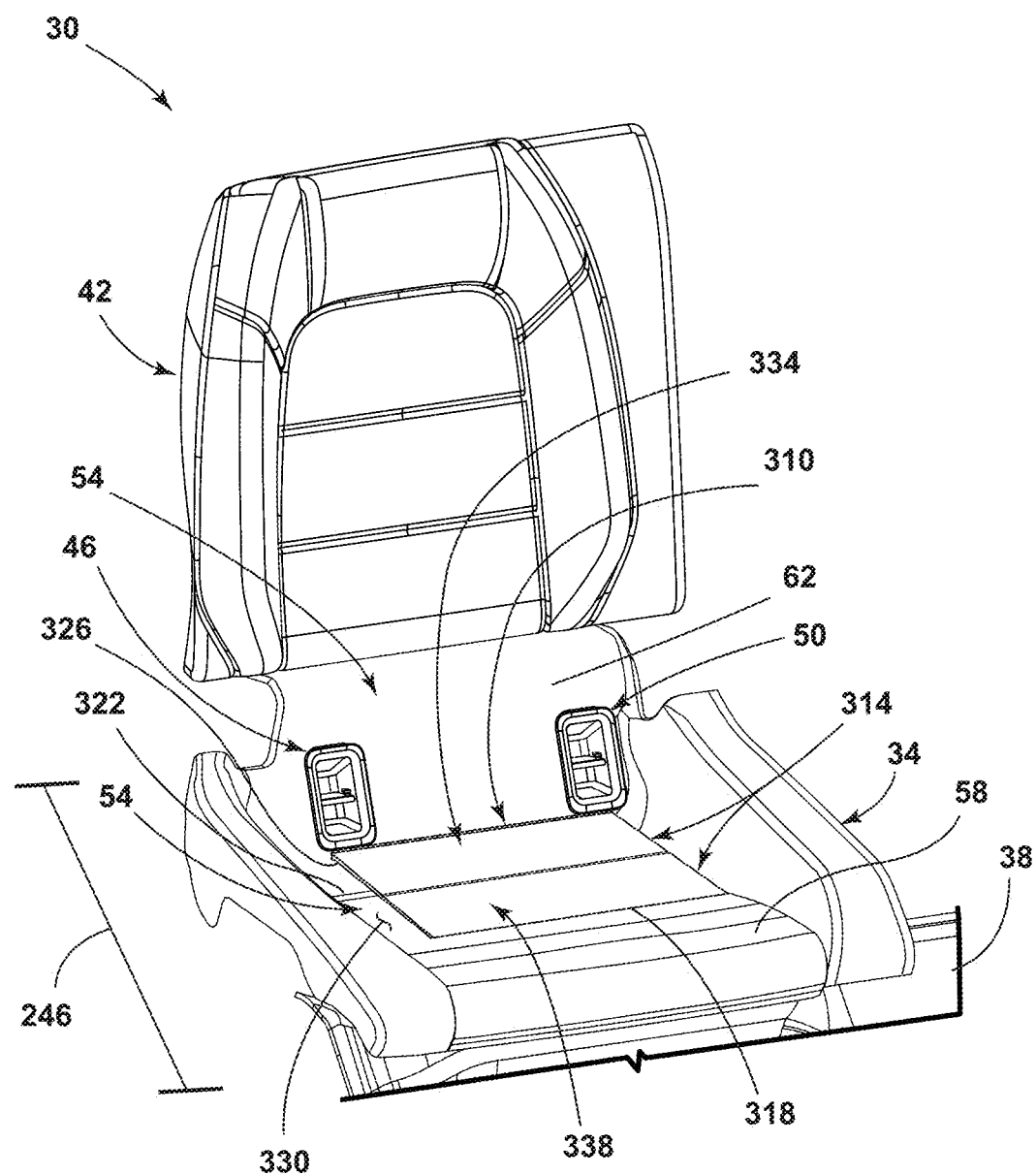
FIG. 16 is a front perspective view of the vehicle seating assembly, illustrating the ramp assembly in a deployed position, according to one example.
Figure 17:
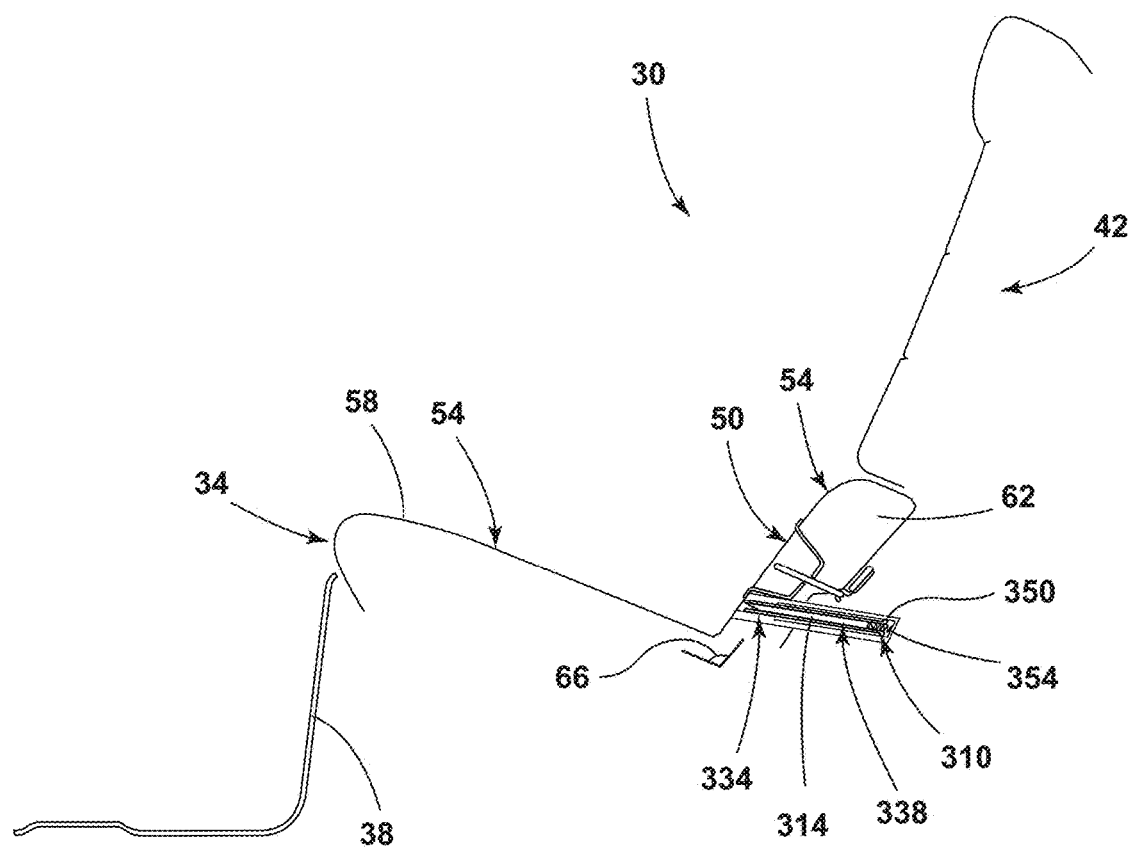
FIG. 17 is a cross-sectional view of the vehicle seating assembly, taken along line XVII-XVII of FIG. 15, illustrating the ramp assembly in the stowed position, according to one example.
Figure 18:
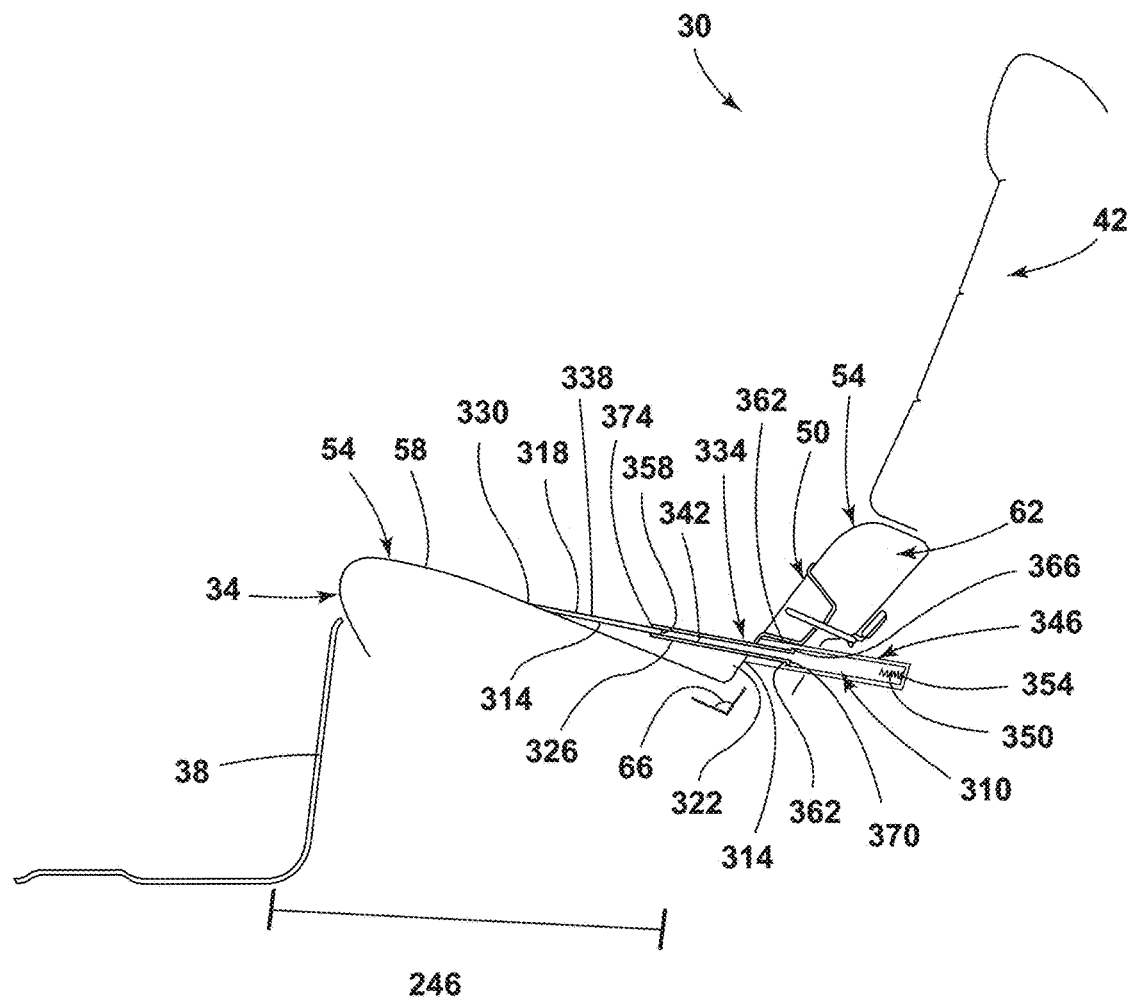
FIG. 18 is a cross-sectional view of the vehicle seating assembly, taken along line XVII-XVII of FIG. 15, illustrating the ramp assembly in the deployed position, according to one example.

Referring now to FIGS. 8-10, the lift assembly 202 can include a pull handle 234 that is coupled to a first end 238 of the actuator 206. In such an example, the actuator 206 can be rotatably coupled to the seat base 34 at a second end 242 of the actuator 206. Application of an upward force upon the pull handle 234 by a user can adjust a position of the first end 238 along a length 246 of the lower portion 58. In the depicted example, the actuator 206 may be provided with a fixed length as opposed to the adjustable or telescoping length of the actuator 206 depicted in FIGS. 6 and 7. Accordingly, as the force is applied in the upward direction to the pull handle 234, an angular relationship between the support structure 38, the lower portion 58, and the actuator 206 may be adjusted. Therefore, a given angular arrangement, or range of angular arrangements, of the actuator 206 relative to the support structure 38 and/or the lower portion 58 can represent a given position of the lower portion 58 (e.g., first position, second position, lowered position, raised position, intermediate position, etc.).

Referring again to FIGS. 8-10, in the depicted example, an angle 250 between the actuator 206 and the support structure 38, as well as an angle 254 between the support structure 38 and the lower portion 58, may be the least when the lower portion 58 is in the lowered position. The angle 250 between the actuator 206 and the support structure 38, as well as the angle 254 between the support structure 38 and the lower portion 58, may be the greatest when the lower portion 58 is in an intermediate position (see FIG. 9). The angle 250 between the actuator 206 and the support structure 38, as well as the angle 254 between the support structure 38 and lower portion 58, may have a value that is between the values associated with the lowered position and the intermediate position. Accordingly, angle 250 and angle 254 may be greater when the lower portion 58 is in the intermediate position than when the lower portion 58 is in the raised position. In some examples, the intermediate position of the lower portion 58 may not be intended as a use position and can instead be utilized solely as a transition between the lowered position and the raised position.

Referring further to FIGS. 8-10, in various examples, the underside 192 of the lower portion 58 may be provided with a guide channel 258 (see inlay in FIGS. 8-10) that enables the various positions of the actuator 206 when assuming the lowered position, the intermediate position, and the raised position. For example, the guide channel 258 may be V-shaped with a first leg 262 and a second leg 266 that come together at a vertex 270. The first and second legs 262, 266 each have terminal ends 274, 278 that are opposite to the vertex 270. In such an arrangement, the first and second legs 262, 266 may have different lengths. For example, the first leg 262 may be longer than the second leg 266 with the terminal end 274 of the first leg 262 being associated with the lowered position of the lower portion 58, the vertex 270 of the first and second legs 262, 266 representing the intermediate position of the lower portion 58, and the terminal end 278 of the second leg 266 representing the raised position of the lower portion 58.

Referring to FIGS. 11-14, the lift assembly 202 can include a motor 282, a shaft 286 that is driven with the motor 282, and a gear 290 that engages with the shaft 286. In some examples, the shaft 286 can be provided with teeth 292 that mesh with the gear 290 in a manner similar to a rack and pinion. In such an example, the motor 282 may linearly actuate the shaft 286 in a manner that induces rotation of the gear 290 and thereby adjusts the position of the lower portion 58. In some examples, the shaft 286 can be a threaded shaft with the threading on the shaft 286 driving the gear 290 to rotate in response to rotational motion imparted to the shaft 286 by the motor 282. Rotation of the shaft 286 by activation of the motor 282 can induce rotation of the gear 290 as a result of the gear 290 meshing with the teeth 292 on the shaft 286. In such an example, protrusions 294 on the gear 290 may be angled to correspond with an angle of inclination of the teeth 292 on the shaft 286. In some examples, where the shaft 286 is a threaded shaft, the gear 290 may be a nut that receives the shaft 286 in a manner similar to a lead screw and a lead nut. The rotation of the gear 290 as a result of the activation of the motor 282 causes the lower portion 58 to be adjusted between the first position and the second position.

Referring again to FIGS. 11-14, as with one or more of the examples above, the vehicle seating assembly 30 can be provided with the first locking bracket 82 that can support the rearward edge 70 of the lower portion 58. In the depicted example, an electromagnet 296 can be provided, with the electromagnet 296 being operable between a disengaged state and an engaged state. The electromagnet 296 is positioned proximate to a locking pin 298. The locking pin 298 is made of a material that is susceptible to magnetic fields. The locking pin 298 is received into the lower portion 58 (e.g., within the rearward edge 70 of the lower portion 58) to retain the lower portion 58 in the second position. In some examples, the electromagnet 296 and the locking pin 298 can be configured such that when the electromagnet 296 is in the engaged state, the locking pin 298 is repelled by the magnetic field produced by the electromagnet 296 such that the locking pin 298 is driven to engage with the lower portion 58. Alternatively, the locking pin 298 may be biased to an extended position (see FIG. 14) as indicated by arrow 302. The biasing force provided to the locking pin 298 may be provided by a biasing member, such as a coil spring. In such an example, the electromagnet 296 and the locking pin 298 can be configured such that when the electromagnet 296 is in the engaged state, the magnetic field attracts the locking pin 298 toward the electromagnet 296 and against the biasing force provided by the biasing member, thereby holding the locking pin 298 in a retracted position. The locking pin 298 can be guided along its actuation path by a guide structure 306. The guide structure 306 may surround the locking pin 298 such that when a load is applied to the lower portion 58, the locking pin 298 bears against a portion of the guide structure 306 that is vertically above the locking pin 298. In examples where the electromagnet 296 and the locking pin 298 are configured such that the engaged state of the electromagnet 296 causes the locking pin 298 to assume the extended position, the guide structure 306 can be arranged at an inclined angle relative to a horizontal plane such that when the electromagnet 296 is in the disengaged state, the locking pin 298 is encouraged to assume the retracted position as a result of a force of gravity acting on the locking pin 298 and the inclination of the guide structure 306.

Referring now to FIGS. 15-26, the vehicle seating assembly 30 includes the seat base 34 with the support structure 38. The seatback 42 is pivotably coupled to the seat base 34. The first anchor access point 46 is positioned in the seat base 34. The second anchor access point 50 is positioned in the seat base 34 and is laterally disposed relative to the first anchor access point 46. The seat surface 54 of the seat base 34 includes the lower portion 58 and the rearward portion 62. The rearward portion 62 is positioned rearward of the lower portion 58. The rearward portion 62 is arranged at the angle 66 relative to the lower portion 58 such that the rearward portion 62 and the lower portion 58 are non-parallel to one another. The seat surface 54 is an occupant-facing surface of the vehicle seating assembly 30. The vehicle seating assembly 30 can include a ramp assembly 310. The ramp assembly 310 can include at least one panel 314 that is movable between a stowed position and a deployed position. The at least one panel 314 can be deployable from the rearward portion 62 of the seat surface 54. The at least one panel 314 can engage with the lower portion 58 at an intermediate location 318 along the length 246 of the lower portion 58 such that a gap 322 is defined between an underside 326 of the at least one panel 314 and an upper surface 330 of the lower portion 58.

Referring again to FIGS. 15-18, the at least one panel 314 can include a first panel 334 and a second panel 338. In some examples, the first panel 334 defines a cavity 342 therein. The cavity 342 can receive the second panel 338, with the second panel 338 being operable between a deployed position and a stowed position relative to the first panel 334. The ramp assembly 310, of which the first and second panels 334, 338 are a part of, can be housed within a panel recess 346 that is defined by the rearward portion 62. The first panel 334 and the second panel 338 can each be operable between a retracted position and an extended position relative to the panel recess 346. Accordingly, the second panel 338 is movable relative to the first panel 334 and the panel recess 346 in an independent manner.

Referring again to FIGS. 15-18, in various examples, a panel biasing member 350 can be coupled to a back wall 354 of the panel recess 346. In some examples, the panel biasing member 350 can be positioned and configured to be received within the cavity 342 of the first panel 334 such that the panel biasing member 350 acts directly upon the second panel 338. Accordingly, the cavity 342 of the first panel 334 can extend from a forward extreme of the first panel 334 to a rearward extreme of the first panel 334. The panel biasing member 350 can bias the ramp assembly 310 to the deployed position. More specifically, when the second panel 338 is in the stowed position relative to the first panel 334 and the first and second panels 334, 338 are each in the retracted position relative to the panel recess 346, the panel biasing member 350 may be in a compressed state as the panel biasing member 350 engages with a rearward extreme 358 of the second panel 338. The compressed state of the panel biasing member 350 can store kinetic energy (e.g., in the form of an applied force when placing the ramp assembly 310 in a fully-retracted position) as potential energy. Therefore, when the ramp assembly 310 is in a fully-retracted position (see FIG. 17) a retention structure may be provided to aid in maintaining the panel biasing member 350 in the compressed state and retain the stored potential energy utilized in the deployment motion. The retention structure may take many forms, including, but not limited to, a movable door, a release assembly, a push-push lock assembly, or any other suitable structure that prevents the unintentional deployment of the ramp assembly 310.

Referring further to FIGS. 15-18, the first panel 334 can be provided with one or more flanges that engage with a front wall 362 of the panel recess 346 such that the first panel 334 is prevented from exiting the panel recess 346 upon deployment. For example, the first panel 334 may be provided with an upper flange 366 and a lower flange 370 that provide an interference fit with the panel recess 346 such that a deployment force provided by the panel biasing member 350 or the user does not result in the first panel 334 exiting the panel recess 346. Similarly, the second panel 338 can be provided with an interference structure proximate to the rearward extreme 358 that interacts with a front wall 374 of the first panel 334 to prevent the second panel 338 from decoupling with the first panel 334 upon deployment of the ramp assembly 310. In various examples, the interference structure may be configured as flanges similar to the upper and lower flanges 366, 370 of the first panel 334. Alternatively, the interference structure may be configured as an increased thickness of the second panel 338 proximate to the rearward extreme 358, where the increased thickness of the second panel 338 is configured to physically impede an exiting of the second panel 338 from the cavity 342 defined by the first panel 334 (e.g., the increased thickness exceeds a diameter of an opening within the front wall 374). In general, the ramp assembly 310 can be positioned within the rearward portion 62 such that the ramp assembly 310 is in close proximity to the first anchor access point 46 and the second anchor access point 50. For example, the ramp assembly 310 can be positioned directly below the first and second anchor access points 46, 50 within the rearward portion 62 or the ramp assembly 310 can be positioned between the first and second anchor access points 46, 50 within the rearward portion 62 such that the ramp assembly 310 extends between a right wall of the first anchor access point 46 and a left wall of the second anchor access point 50.

Figure 19:
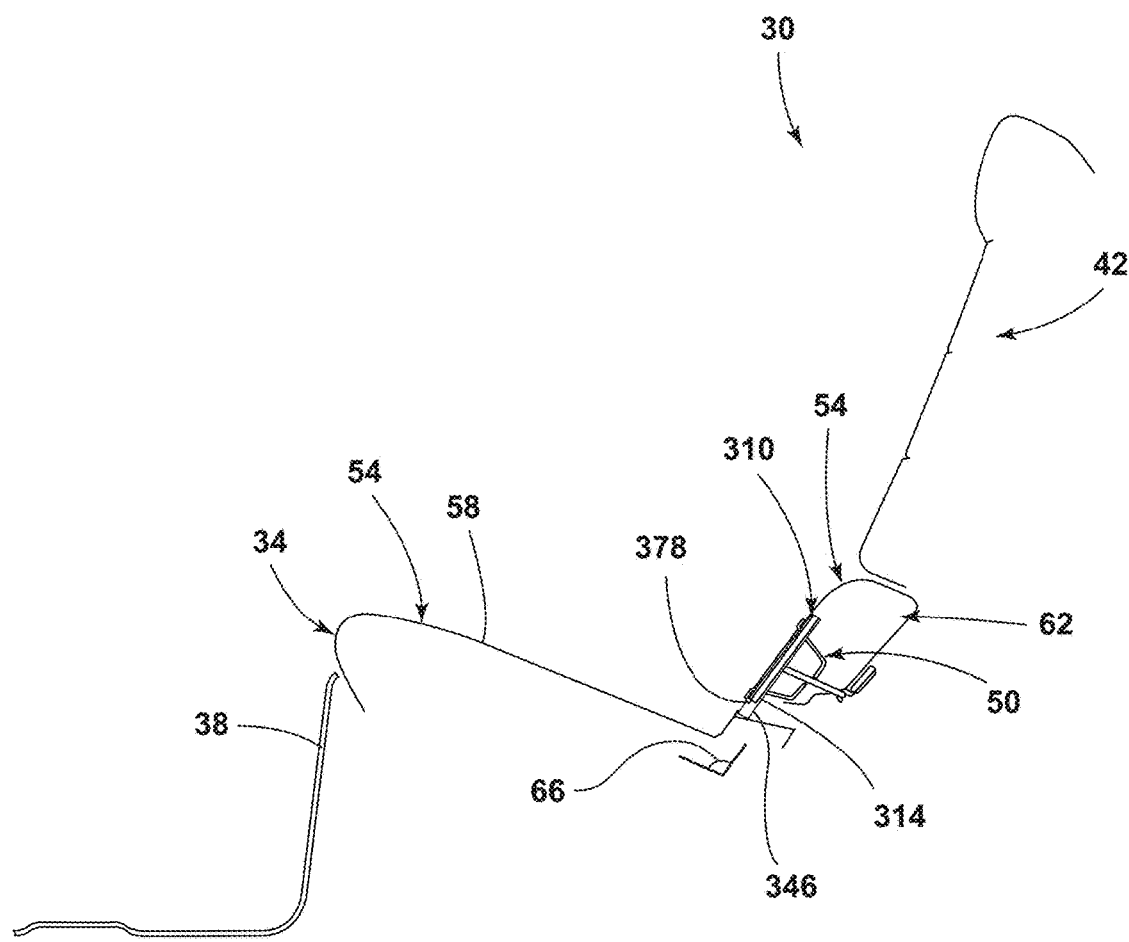
FIG. 19 is a cross-sectional view of the vehicle seating assembly, taken along line XVII-XVII of FIG. 15, illustrating the ramp assembly in the stowed position, according to another example.
Figure 20:
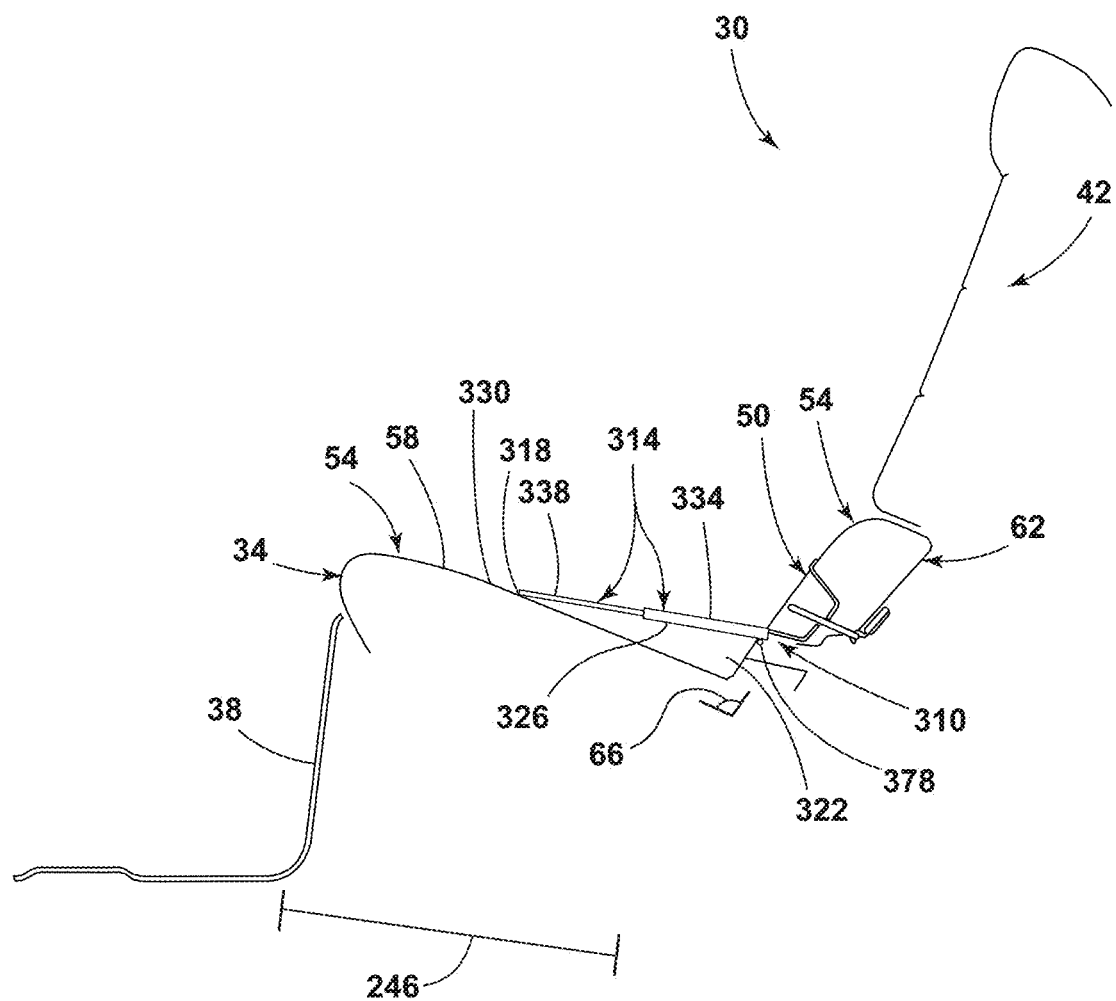
FIG. 20 is a cross-sectional view of the vehicle seating assembly, taken along line XVII-XVII of FIG. 15, illustrating the ramp assembly in the deployed position, according to another example.
Figure 21:
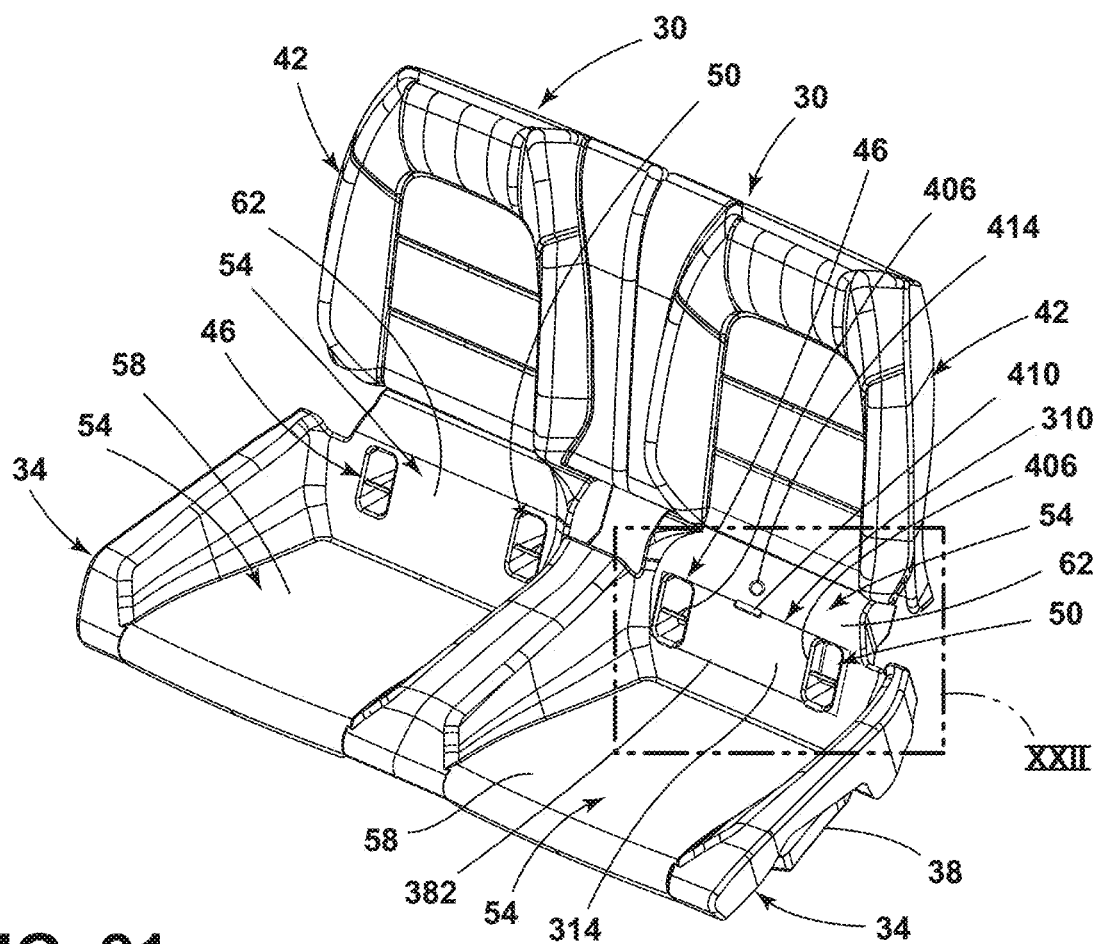
FIG. 21 is a front perspective view of the vehicle seating assemblies, illustrating the ramp assembly in the stowed position, according to one example.
Figure 22:
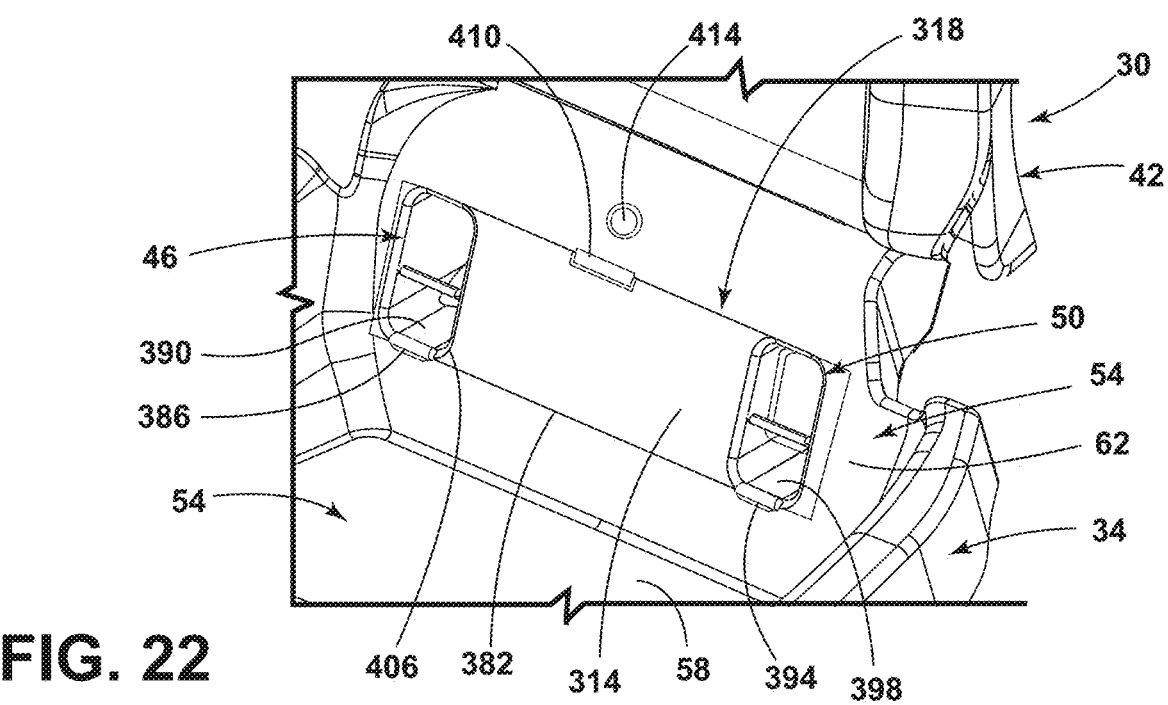
FIG. 22 is an expanded view from region XXII of FIG. 21, illustrating the ramp assembly in the stowed position, according to one example.
Figure 23:
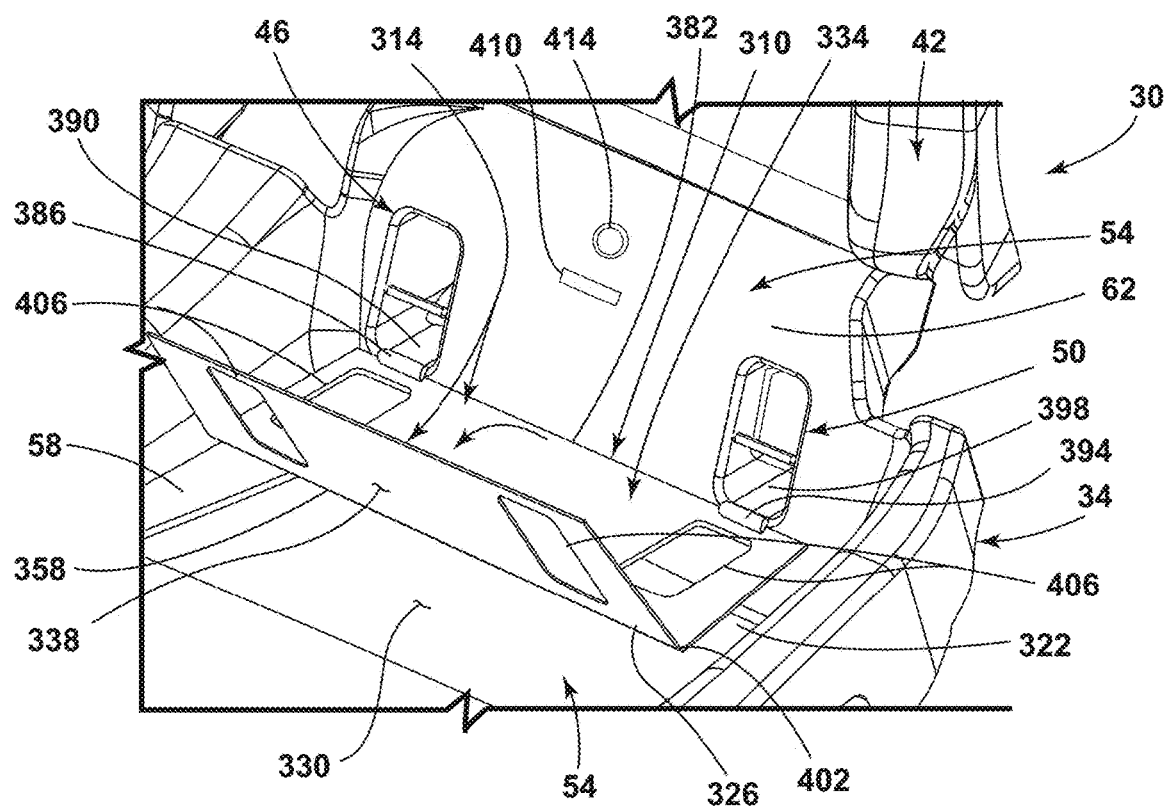
FIG. 23 is an expanded view from region XXII of FIG. 21, illustrating the ramp assembly in a partially-deployed position, according to one example.
Figure 24:
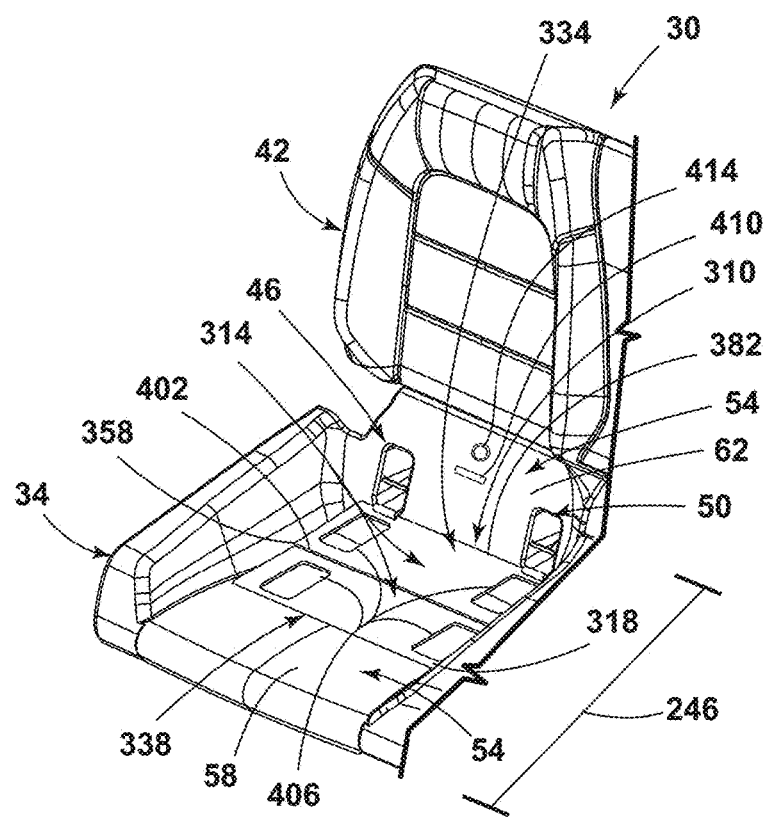
FIG. 24 is a front perspective view of the vehicle seating assembly, illustrating the ramp assembly in the deployed position, according to one example.

Referring to FIGS. 19 and 20, the ramp assembly 310 is depicted as a combination rotational and telescoping deployment. The at least one panel 314 can include the first panel 334 and second panel 338. The first panel 334 is rotatably or pivotably coupled to the rearward portion 62 at pivot point 378. As with the preceding example, the second panel 338 is received within the first panel 334 (e.g., within the cavity 342) and can be arranged with a similar interference structure to that discussed in relation to FIGS. 15-18. In the depicted example, the panel recess 346 is shallower than that depicted in FIGS. 15-18 and has a cross-section that is greater than the cross-section of the first panel 334. The additional space provided by the greater cross-section of the panel recess 346 in the depicted example can extend below the stowed ramp assembly 310 and provide a region that receives a portion of the first panel 334 when the ramp assembly 310 is rotated to a deployed position. For example, the pivot point 378 may be positioned proximate to a first end 382 of the first panel 334, with the first end 382 being received within the region of the panel recess 346 that is immediately below the first end 382 when the ramp assembly 310 is in the stowed position. In the depicted example, the stowed ramp assembly 310 can cover the first anchor access point 46 and/or the second anchor access point 50 when the ramp assembly 310 is in the stowed position (see FIG. 19).

Referring to FIGS. 21-24, as with some of the examples discussed above, the at least one panel 314 can include the first panel 334 and the second panel 338. The first panel 334 is rotatably coupled to the rearward portion 62 at the first end 382. In the depicted example, a first hinge 386 is coupled to the first end 382 of the first panel 334 along a lower wall 390 of the first anchor access point 46. Similarly, the first end 382 of the first panel 334 is coupled to a second hinge 394 along a lower wall 398 of the second anchor access point 50. In some examples, the first end 382 of the first panel 334 may also be hingedly coupled, rotatably coupled, or pivotably coupled to the rearward portion 62 at regions that are between the first and second hinges 386, 394. The second panel 338 is rotatably coupled to the first panel 334 at a second end 402 of the first panel 334. For example, the rearward extreme 358 of the second panel 338 can be coupled to the second end 402 of the first panel 334 in a manner that permits rotational motion about the coupling between the first and second panels 334, 338. In various examples, the ramp assembly 310 can extend between the first and second anchor access points 46, 50 when in the stowed position. In some examples, the first panel 334 and/or the second panel 338 may be provided with one or more anchor apertures 406 defined therein such that the anchors 74 of the first and second anchor access points 46, 50 may be accessible when the ramp assembly 310 is in the stowed position.

Referring again to FIGS. 21-24, in some examples, the ramp assembly 310 may be retained in the stowed position by a panel latch 410. The panel latch 410 can engage with the second end 402 of the first panel 334 and/or the rearward extreme 358 of the second panel 338 to prevent unintentional deployment of the ramp assembly 310. In some examples, the panel latch 410 may be coupled to a latch release 414. Actuation of the latch release 414 can disengaged the panel latch 410 to enable deployment of the ramp assembly 310. Deployment of the ramp assembly 310 upon release of the panel latch 410 can be done in a manual fashion by a user applying a force to the ramp assembly 310, performed passively as a result of gravity acting on the released ramp assembly 310, or can be performed in an active manner as a result of a biasing force applied to the ramp assembly 310. For example, the biasing force applied to the ramp assembly 310 can be provided by a clock spring in one or more of the first hinge 386 and the second hinge 394.

Figure 25:
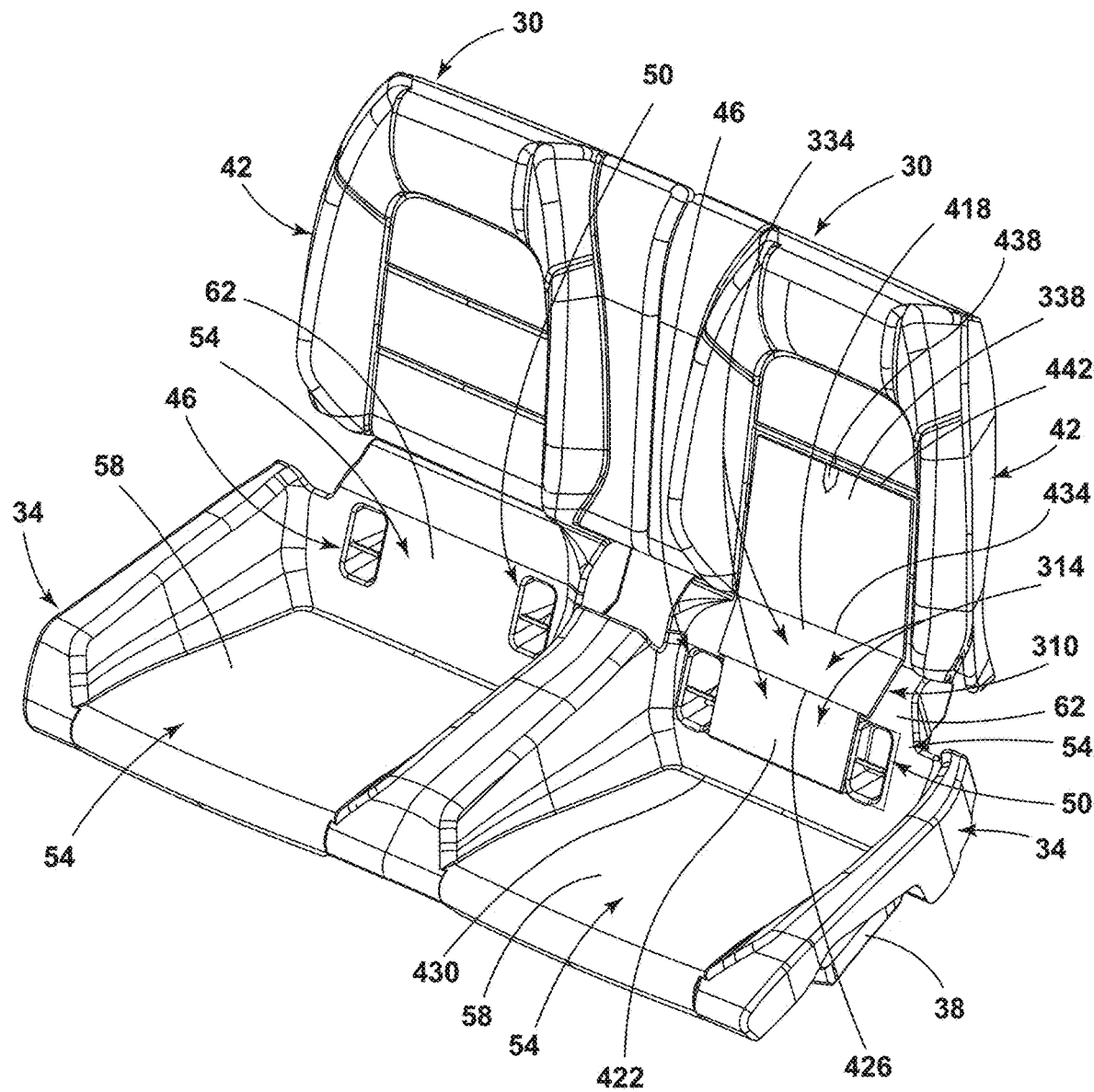
FIG. 25 is a front perspective view of the vehicle seating assemblies, illustrating the ramp assembly in the stowed position, according to another example.
Figure 26:
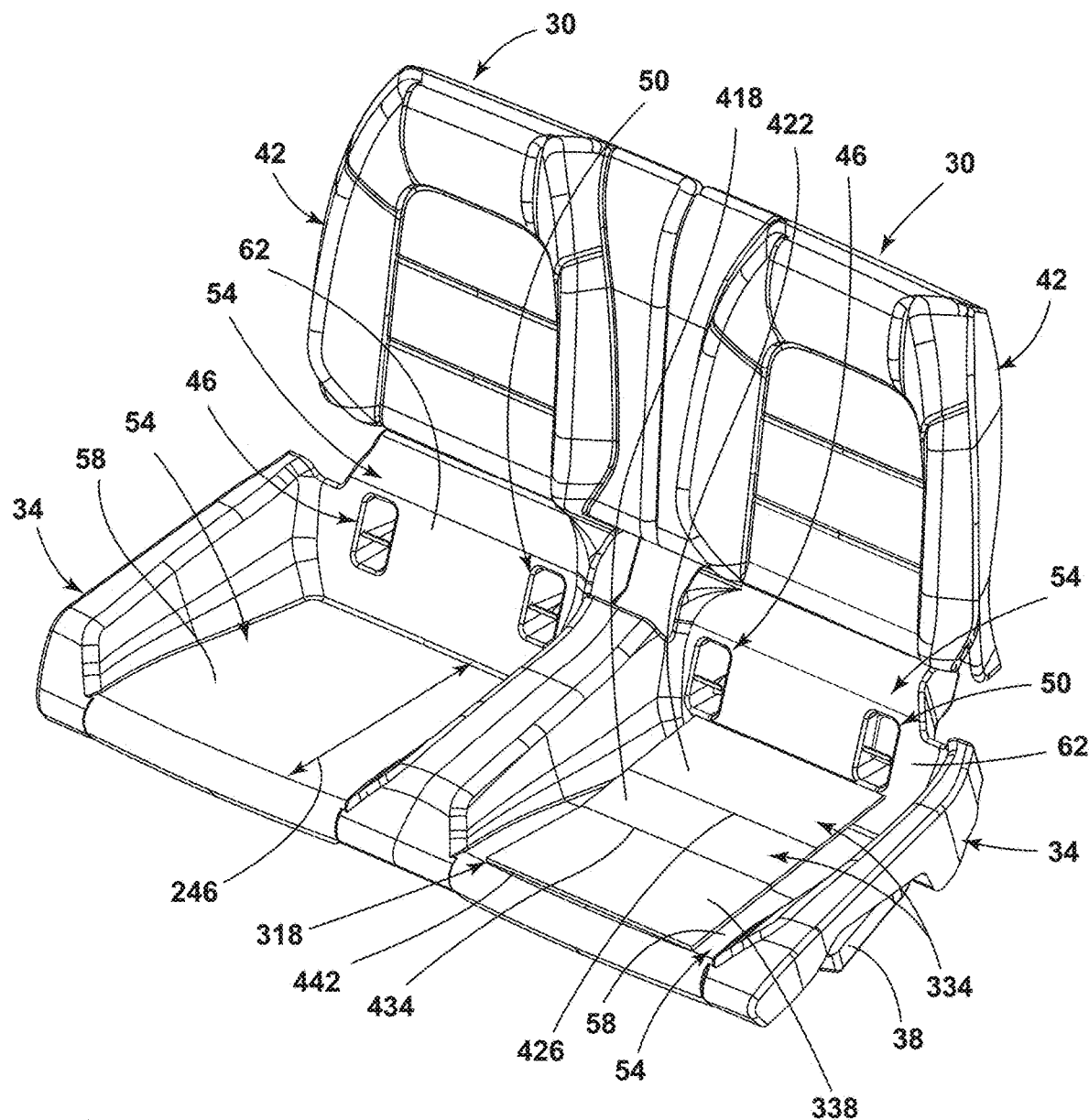
FIG. 26 is a front perspective view of the vehicle seating assemblies, illustrating the ramp assembly in the deployed positions, according to another example.

Referring to FIGS. 25 and 26, the at least one panel 314 includes the first panel 334 and the second panel 338. In the depicted example, the first panel 334 may be divided into an upper portion 418 and a lower portion 422. The upper portion 418 and the lower portion 422 may be separated by an inflection point 426 of the first panel 334. The inflection point 426 can enable the first panel to match the contours of the rearward portion 62 of the seat surface 54. The inflection point 426 does not permit rotational motion of the upper portion 418 relative to the lower portion 422 about the inflection point 426. That is, the inflection point 426 does not represent a rotational axis of the upper portion 418 relative to lower portion 422. By not enabling the rotational motion of the upper portion 418 relative to the lower portion 422 about the inflection point 426, a degree of rigidity can be provided to the first panel 334 when the first panel 334 is in the deployed position. When in the deployed position, the first panel 334 may lack direct support that is immediately adjacent to at least a portion of the underside 326 of the first panel 334. That is to say, the gap 322 can exist between the first panel 334 and the lower portion 58. While rotational motion about the inflection point 426 may be prohibited, the first panel 334 is rotatable relative to the rearward portion 62 about a lower hinge 430.

Referring further to FIGS. 25 and 26, in the depicted example, the second panel 338 extends over at least a portion of the seatback 42 when the ramp assembly 310 is in the stowed position (see FIG. 25). The second panel 338 is coupled to the first panel 334 at an upper hinge 434. In addition to defining a rotational axis about which the second panel 338 rotates relative to the first panel 334, the upper hinge 434 can represent an axis or plane that separates the seat base 34 from the seatback 42. Accordingly, when the seatback 42 is rotated to a forward-dumped position, the ramp assembly 310 may remain in the stowed position without impeding the rotation of the seatback 42 to the forward-dumped position. In some examples, a release handle 438 may be provided at a free end 442 of the second panel 338. The release handle 438 can be utilized by a user to transition the ramp assembly 310 from the stowed position to the deployed position. In various examples, the upper hinge 434 can couple the first panel 334 to the second panel 338 in a manner that provides a degree of overlap between the first panel 334 and the second panel 338 such that a degree of rotational freedom about the upper hinge 434 is limited. Said another way, the first panel 334 and/or the second panel 338 can extend through the upper hinge 434 rather than coupling to opposing sides of the upper hinge 434 such that overhanging edges of the first panel 334 and/or the second panel 338 exist on diametrically opposed sides of the upper hinge 434 from a side of the upper hinge 434 where a majority of the length of the associated panel exists. This overhang of the first panel 334 and/or the second panel 338 relative to the upper hinge 434 may provide an increased degree of rigidity in the region of the upper hinge 434 for supporting the auxiliary seat 78 when the ramp assembly 310 is in the deployed position. Additionally, the overhang of the first panel 334 and/or the second panel 338 relative to the upper hinge 434 can limit rotational motion about the upper hinge 434 to being unidirectional (e.g., clockwise or counterclockwise).

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly, comprising:
   a seat base having a support structure;
   a seatback pivotably coupled to the seat base;
   a first anchor access point positioned in the seat base;
   a second anchor access point positioned in the seat base and laterally disposed relative to the first anchor access point;
   a seat surface of the seat base, the seat surface having a lower portion and a rearward portion, wherein the rearward portion is positioned rearward of the lower portion, wherein the rearward portion is arranged at an angle relative to the lower portion such that the rearward portion and the lower portion are non-parallel to one another, wherein the angle between the lower portion and the rearward portion is increased when the lower portion is moved from a first position to a second position, wherein the seat surface is an occupant-facing surface, and wherein the lower portion is adjustable relative to the support structure such that a rearward edge of the lower portion is movable relative to the rearward portion;
   a first locking bracket associated with the first position;
   a second locking bracket associated with the second position; and
   a linkage assembly that is movable between the first and second locking brackets.

2. The vehicle seating assembly of claim 1, wherein the first position is a lowered position and the second position is a raised position.

3. The vehicle seating assembly of claim 1, wherein the linkage assembly comprises:
   a ratchet bracket positioned proximate to a forward edge of the seat base, the ratchet bracket defining at least two teeth;
   a release access point positioned proximate to the rearward edge of the lower portion;
   a body extending between the ratchet bracket and the release access point, the body being pivotably coupled to the ratchet bracket, wherein the body defines a channel; and
   a release assembly housed within the channel of the body and biased to a locked position.

4. The vehicle seating assembly of claim 3, wherein the release assembly comprises:
   a locking pawl that engages with the ratchet bracket to retain the lower portion in a given position chosen from the first position and the second position;
   a release button positioned proximate to the release access point;
   a release bar extending between the locking pawl and the release button; and
   a lock biasing member positioned within the channel and bearing against the locking pawl to provide a biasing force that biases the release assembly to the locked position.

5. The vehicle seating assembly of claim 4, wherein the release assembly further comprises:
   a release pin extending from the release bar, wherein the release pin engages with the first locking bracket when the lower portion is in the first position, and wherein the release pin engages with the second locking bracket when the lower portion is in the second position.

6. A vehicle seating assembly, comprising:
   a seat base having a support structure;
   a seatback pivotably coupled to the seat base;
   a first anchor access point positioned in the seat base;
   a second anchor access point positioned in the seat base and laterally disposed relative to the first anchor access point;
   a seat surface of the seat base, the seat surface having a lower portion and a rearward portion, wherein the rearward portion is positioned rearward of the lower portion, wherein the rearward portion is arranged at an angle relative to the lower portion such that the rearward portion and the lower portion are non-parallel to one another, wherein the seat surface is an occupant-facing surface; and
   a ramp assembly having at least one panel that is movable between a stowed position and a deployed position, wherein the at least one panel is deployable from the rearward portion of the seat surface, and wherein the at least one panel engages with the lower portion at an intermediate location along a length of the lower portion such that a gap is defined between an underside of the at least one panel and an upper surface of the lower portion.

7. The vehicle seating assembly of claim 6, wherein the at least one panel comprises a first panel and a second panel, wherein the first panel defines a cavity therein that receives the second panel, and wherein the second panel is operable to a deployed position relative to the first panel.

8. The vehicle seating assembly of claim 7, wherein the ramp assembly is housed within a panel recess that is defined by the rearward portion, wherein the first panel and the second panel are each operable between a retracted position and an extended position relative to the panel recess.

9. The vehicle seating assembly of claim 8, further comprising:
   a panel biasing member coupled to a back wall of the panel recess, wherein the panel biasing member is positioned and configured to be received within the cavity of the first panel such that the panel biasing member acts upon the second panel, and wherein the panel biasing member biases the ramp assembly to the deployed position.

10. The vehicle seating assembly of claim 7, wherein the ramp assembly is rotatably coupled to the rearward portion at a first end of the first panel.

11. The vehicle seating assembly of claim 6, wherein the at least one panel comprises a first panel and a second panel, wherein the first panel is rotatably coupled to the rearward portion at a first end, and wherein the second panel is rotatably coupled to the first panel at a second end of the first panel.

12. The vehicle seating assembly of claim 11, wherein the second panel extends over at least a portion of the seatback when the ramp assembly is in the stowed position.

13. A vehicle seating assembly, comprising:
   a seat base having a support structure;
   a seatback pivotably coupled to the seat base;
   a first anchor access point positioned in the seat base;
   a second anchor access point positioned in the seat base and laterally disposed relative to the first anchor access point;
   a seat surface of the seat base, the seat surface having a lower portion and a rearward portion, wherein the rearward portion is positioned rearward of the lower portion, wherein the rearward portion is arranged at an angle relative to the lower portion such that the rearward portion and the lower portion are non-parallel to one another, wherein the angle between the lower portion and the rearward portion is increased when the lower portion is moved from a first position to a second position, wherein the seat surface is an occupant-facing surface, and wherein the lower portion is adjustable relative to the support structure such that a rearward edge of the lower portion is movable relative to the rearward portion;
   a lift assembly that engages with an underside of the lower portion, the lift assembly comprising an actuator, wherein the actuator that is movable between the lowered position and the raised position, wherein the actuator is coupled to a push-push lock assembly, wherein the actuator is provided with a biasing force that biases the actuator to the raised position.

14. The vehicle seating assembly of claim 13, wherein the lift assembly further comprises:
   a pull handle coupled to a first end of the actuator, wherein the actuator is rotatably coupled to the seat base at a second end of the actuator, and wherein application of an upward force upon the pull handle adjusts a position of the first end along a length of the lower portion.

15. The vehicle seating assembly of claim 13, wherein the lift assembly comprises:
   a motor;
   a shaft that is driven to rotate by the motor; and
   a gear that engages with the shaft such that rotation of the shaft induces rotation of the gear, wherein the rotation of the gear causes the lower portion to be adjusted between the first position and the second position.

16. The vehicle seating assembly of claim 13, further comprising:
   an electromagnet operable between a disengaged state and an engaged state; and
   a locking pin that is susceptible to a magnetic field, the locking pin being received into the lower portion to retain the lower portion in the second position when the electromagnet is in the engaged state.

* * * * *